United States Patent
Jones et al.

(10) Patent No.: US 7,903,863 B2
(45) Date of Patent: Mar. 8, 2011

(54) CURRENCY BILL TRACKING SYSTEM

(75) Inventors: John E. Jones, Winnetka, IL (US);
William J. Jones, Barrington, IL (US);
Douglas U. Mennie, Barrington, IL
(US); Paul A. Jones, Glenview, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 1020 days.

(21) Appl. No.: 10/638,231

(22) Filed: Aug. 7, 2003

(65) Prior Publication Data

US 2004/0028266 A1    Feb. 12, 2004

Related U.S. Application Data

(63) Continuation-in-part of application No. 09/965,428, filed on Sep. 27, 2001, now Pat. No. 7,187,795.

(51) Int. Cl.
*G06K 9/00* (2006.01)

(52) U.S. Cl. .............................. 382/135; 705/45; 235/379

(58) Field of Classification Search ................... 382/135, 382/136, 137, 138, 139, 140, 100
See application file for complete search history.

(56) References Cited

U.S. PATENT DOCUMENTS

| | | | |
|---|---|---|---|
| 446,303 A | 2/1891 | Tompson | |
| 2,669,998 A | 2/1954 | Buchholz | |
| 2,750,949 A | 6/1956 | Kulo et al. | |
| 2,835,260 A | 5/1958 | Buchholz | |
| 2,936,684 A | 5/1960 | Simjian | 396/332 |
| 3,104,314 A | 9/1963 | Simjian | 346/22 |
| 3,148,932 A | 9/1964 | Simjian | 346/22 |
| 3,150,912 A | 9/1964 | Simjian | 346/22 |
| 3,246,295 A | 4/1966 | DeClaris et al. | |
| 3,280,974 A | 10/1966 | Riddle et al. | |
| 3,443,107 A | 5/1969 | Modglin | |
| 3,480,785 A | 11/1969 | Aufderheide | |
| 3,496,370 A | 2/1970 | Haville et al. | |
| 3,509,535 A | 4/1970 | Berube | |
| 3,612,835 A | 10/1971 | Andrews et al. | |
| 3,618,765 A | 11/1971 | Syoasel et al. | |
| 3,656,615 A | 4/1972 | Ptacek | |
| 3,679,314 A | 7/1972 | Mustert | |
| 3,715,031 A | 2/1973 | Okkonen | |
| 3,725,667 A | 4/1973 | Schwartz | |
| 3,764,899 A | 10/1973 | Peterson | |
| 3,778,628 A | 12/1973 | Novak et al. | |
| 3,782,543 A | 1/1974 | Martelli et al. | |

(Continued)

FOREIGN PATENT DOCUMENTS

CA    2 684 159 A1    4/2010

(Continued)

OTHER PUBLICATIONS

U.S. Appl. No. 09/607,019, filed Jun. 29, 2000, Apparatus with Two or More Pockets For Document Processing.

(Continued)

*Primary Examiner* — Anand Bhatnagar
(74) *Attorney, Agent, or Firm* — Nixon Peabody LLP

(57) ABSTRACT

A system and method is presented for tracking and tracing currency bills involved in deposit and withdrawal transactions. A transaction identifier is obtained. Currency bills involved in the transaction are scanned in order to obtain their serial numbers. The serial numbers are then linked to the transaction identifier.

47 Claims, 12 Drawing Sheets

U.S. PATENT DOCUMENTS

| | | | | |
|---|---|---|---|---|
| 3,798,603 | A | 3/1974 | Wahlberg | |
| 3,800,078 | A | 3/1974 | Cochran et al. | |
| 3,806,710 | A | 4/1974 | Shigemori et al. | |
| 3,815,021 | A | 6/1974 | Kerr | |
| 3,842,281 | A | 10/1974 | Goodrich | |
| 3,870,629 | A | 3/1975 | Carter et al. | |
| 3,906,449 | A | 9/1975 | Marchak | |
| 3,930,582 | A | 1/1976 | Gartner et al. | |
| 3,966,047 | A | 6/1976 | Steiner | |
| 3,976,198 | A | 8/1976 | Carnes, Jr. et al. | 209/534 |
| 4,023,011 | A | 5/1977 | Nakajima et al. | 235/478 |
| 4,027,142 | A | 5/1977 | Paup et al. | 235/379 |
| 4,040,010 | A | 8/1977 | Crane | |
| 4,041,456 | A | 8/1977 | Ott et al. | |
| 4,096,991 | A | 6/1978 | Iguchi | |
| 4,109,238 | A | 8/1978 | Creekmore | 340/149 |
| 4,114,027 | A | 9/1978 | Slater | 705/43 |
| 4,114,804 | A | 9/1978 | Jones et al. | 235/476 |
| 4,147,430 | A | 4/1979 | Gorgone et al. | |
| 4,166,945 | A | 9/1979 | Inoyama et al. | |
| 4,179,685 | A | 12/1979 | O'Maley | |
| 4,180,798 | A | 12/1979 | Komori et al. | |
| 4,187,463 | A | 2/1980 | Kivenson | |
| 4,187,498 | A | 2/1980 | Creekmore | |
| 4,197,986 | A | 4/1980 | Nagata | 235/379 |
| 4,201,978 | A | 5/1980 | Nally | 382/140 |
| 4,205,780 | A | 6/1980 | Burns et al. | 235/454 |
| 4,231,014 | A | 10/1980 | Ponzio | |
| 4,231,561 | A | 11/1980 | Kaneko et al. | |
| 4,237,378 | A | 12/1980 | Jones | |
| 4,250,806 | A | 2/1981 | Boyson et al. | 101/2 |
| 4,255,651 | A | 3/1981 | Phillips | |
| 4,264,808 | A | 4/1981 | Owens et al. | 235/379 |
| 4,275,874 | A | 6/1981 | DiBlasio | |
| 4,277,774 | A | 7/1981 | Fujii et al. | |
| 4,283,708 | A | 8/1981 | Lee | |
| 4,288,781 | A | 9/1981 | Stellner et al. | |
| 4,302,781 | A | 11/1981 | Ikeda et al. | |
| 4,310,885 | A | 1/1982 | Azcua et al. | |
| 4,311,914 | A | 1/1982 | Huber | |
| 4,313,598 | A | 2/1982 | DiBlasio | |
| 4,321,612 | A | 3/1982 | Bean et al. | |
| 4,321,672 | A | 3/1982 | Braun et al. | 705/42 |
| 4,326,636 | A | 4/1982 | Braun et al. | |
| 4,334,619 | A | 6/1982 | Horino et al. | |
| 4,337,864 | A | 7/1982 | McLean | |
| 4,348,656 | A | 9/1982 | Gorgone et al. | |
| 4,349,111 | A | 9/1982 | Shah et al. | |
| 4,352,988 | A | 10/1982 | Ishida | |
| 4,355,300 | A | 10/1982 | Weber | |
| 4,355,369 | A | 10/1982 | Garvin | |
| 4,356,473 | A | 10/1982 | Freudenthal | |
| 4,360,034 | A | 11/1982 | Davila et al. | |
| 4,381,447 | A | 4/1983 | Horvath et al. | |
| 4,383,540 | A | 5/1983 | DeMeyer et al. | |
| 4,386,432 | A | 5/1983 | Nakamura et al. | |
| 4,396,902 | A | 8/1983 | Warthan et al. | |
| 4,416,299 | A | 11/1983 | Bergman | |
| 4,420,153 | A | 12/1983 | Winkler et al. | |
| 4,435,834 | A | 3/1984 | Pauli et al. | 382/135 |
| 4,441,205 | A | 4/1984 | Berkin et al. | |
| 4,442,541 | A | 4/1984 | Finkel et al. | 382/7 |
| 4,449,240 | A | 5/1984 | Yoshida | |
| 4,461,028 | A | 7/1984 | Okubo | |
| 4,464,786 | A | 8/1984 | Nishito et al. | |
| 4,464,787 | A | 8/1984 | Fish et al. | |
| RE31,692 | E | 10/1984 | Tyburski et al. | |
| 4,480,177 | A | 10/1984 | Allen | |
| 4,482,058 | A | 11/1984 | Steiner | |
| 4,487,306 | A | 12/1984 | Nao et al. | 194/4 |
| 4,490,846 | A | 12/1984 | Ishida et al. | |
| 4,513,439 | A | 4/1985 | Gorgone et al. | |
| 4,521,008 | A | 6/1985 | Granzow et al. | 271/3 |
| 4,523,330 | A | 6/1985 | Cain | 382/140 |
| 4,530,067 | A | 7/1985 | Dorr | |
| 4,538,719 | A | 9/1985 | Gray et al. | |
| 4,539,702 | A | 9/1985 | Oka | |
| 4,542,829 | A | 9/1985 | Enery et al. | 209/534 |
| 4,543,969 | A | 10/1985 | Rasmussen | |
| 4,544,266 | A | 10/1985 | Antes | |
| 4,547,896 | A | 10/1985 | Ohtombe et al. | |
| 4,553,222 | A | 11/1985 | Kurland et al. | |
| 4,553,846 | A | 11/1985 | Hilton et al. | |
| 4,556,140 | A | 12/1985 | Okada | |
| 4,558,224 | A | 12/1985 | Gober | |
| 4,559,451 | A | 12/1985 | Curl | |
| 4,563,771 | A | 1/1986 | Gorgone et al. | 382/135 |
| 4,567,370 | A | 1/1986 | Falls | |
| 4,569,421 | A | 2/1986 | Sandstedt | |
| 4,582,172 | A | 4/1986 | Takeuchi et al. | |
| 4,584,529 | A | 4/1986 | Aoyama | |
| 4,587,412 | A | 5/1986 | Apisdorf | |
| 4,587,434 | A | 5/1986 | Roes et al. | |
| 4,590,606 | A | 5/1986 | Rohrer | |
| 4,592,090 | A | 5/1986 | Curl et al. | |
| 4,593,184 | A | 6/1986 | Bryce | |
| 4,594,664 | A | 6/1986 | Hashimoto | 364/405 |
| 4,602,332 | A | 7/1986 | Hirose et al. | |
| 4,605,926 | A | 8/1986 | Onishi et al. | |
| 4,611,345 | A | 9/1986 | Ohnishi et al. | |
| 4,617,457 | A | 10/1986 | Granzow et al. | 235/379 |
| 4,617,458 | A | 10/1986 | Bryce | |
| 4,628,194 | A | 12/1986 | Dobbins et al. | |
| 4,645,936 | A | 2/1987 | Gorgone | |
| 4,653,647 | A | 3/1987 | Hashimoto | |
| 4,658,289 | A | 4/1987 | Nagano et al. | |
| 4,676,343 | A | 6/1987 | Humble et al. | |
| 4,677,682 | A | 6/1987 | Miyagawa et al. | |
| 4,678,072 | A | 7/1987 | Kobayashi et al. | |
| 4,680,803 | A | 7/1987 | Delella | |
| 4,685,141 | A | 8/1987 | Hogue et al. | 382/7 |
| 4,686,357 | A | 8/1987 | Douno et al. | |
| 4,694,963 | A | 9/1987 | Takesako | |
| 4,697,071 | A | 9/1987 | Hiraoka et al. | |
| 4,700,368 | A | 10/1987 | Munn et al. | 377/8 |
| 4,716,456 | A | 12/1987 | Hosaka | |
| 4,733,308 | A | 3/1988 | Nakamura et al. | |
| 4,735,289 | A | 4/1988 | Kenyon | |
| 4,743,743 | A | 5/1988 | Fukatsu | |
| 4,743,974 | A | 5/1988 | Lockwood | |
| 4,748,679 | A | 5/1988 | Gold et al. | |
| 4,749,087 | A | 6/1988 | Buttifant | |
| 4,753,625 | A | 6/1988 | Okada | |
| 4,764,725 | A | 8/1988 | Bryce | |
| 4,764,976 | A | 8/1988 | Kallin et al. | |
| 4,768,100 | A | 8/1988 | Kunishima et al. | |
| 4,774,663 | A | 9/1988 | Musmanno et al. | |
| 4,782,328 | A | 11/1988 | Denlinger | |
| 4,784,274 | A | 11/1988 | Mori et al. | |
| 4,803,347 | A | 2/1989 | Sugahara et al. | |
| 4,806,709 | A | 2/1989 | Evans | |
| 4,811,004 | A | 3/1989 | Person et al. | |
| 4,817,176 | A | 3/1989 | Marshall et al. | |
| 4,821,332 | A | 4/1989 | Durham | |
| 4,823,393 | A | 4/1989 | Kawakami | 382/135 |
| 4,825,246 | A | 4/1989 | Pukuchi et al. | |
| 4,827,531 | A | 5/1989 | Milford | |
| 4,837,842 | A | 6/1989 | Holt | |
| 4,841,358 | A | 6/1989 | Kammoto et al. | |
| 4,851,616 | A | 7/1989 | Wales et al. | |
| 4,877,230 | A | 10/1989 | Winkler et al. | |
| 4,880,096 | A | 11/1989 | Kobayashi et al. | |
| 4,881,268 | A | 11/1989 | Uchida et al. | |
| 4,883,181 | A | 11/1989 | Yoshikawa | |
| 4,888,812 | A | 12/1989 | Dinan et al. | 382/7 |
| 4,903,953 | A | 2/1990 | Winkler et al. | |
| 4,905,839 | A | 3/1990 | Yuge et al. | |
| 4,905,840 | A | 3/1990 | Yuge et al. | 209/534 |
| 4,908,516 | A | 3/1990 | West | |
| 4,922,109 | A | 5/1990 | Bercovitz et al. | |
| 4,928,094 | A | 5/1990 | Smith | |
| 4,931,782 | A | 6/1990 | Jackson | |
| 4,947,441 | A | 8/1990 | Hara et al. | |
| 4,948,174 | A | 8/1990 | Thomson et al. | 283/58 |
| 4,954,697 | A | 9/1990 | Kokubun et al. | |
| 4,958,235 | A | 9/1990 | Sims et al. | 358/402 |
| 4,960,981 | A | 10/1990 | Benton et al. | 705/41 |

| | | | | | | |
|---|---|---|---|---|---|---|
| 4,970,655 A | 11/1990 | Winn et al. | | 5,381,019 A | 1/1995 | Sato |
| 4,973,851 A | 11/1990 | Lee | | 5,383,754 A | 1/1995 | Sumida et al. ................. 412/11 |
| 4,980,543 A | 12/1990 | Hara et al. ..................... 235/379 | | 5,394,969 A | 3/1995 | Harbaugh |
| 4,984,280 A | 1/1991 | Abe ................... 382/7 | | 5,399,874 A | 3/1995 | Gonsalves et al. |
| 4,992,860 A | 2/1991 | Harnaguchi et al. | | 5,402,895 A | 4/1995 | Mikkelsen et al. |
| 4,996,604 A | 2/1991 | Ogawa et al. | | 5,416,307 A | 5/1995 | Danek et al. ................. 235/449 |
| 5,010,238 A | 4/1991 | Kadono et al. | | 5,417,316 A | 5/1995 | Harbaugh |
| 5,023,782 A | 6/1991 | Lutz et al. | | 5,418,458 A | 5/1995 | Jeffers |
| 5,027,415 A | 6/1991 | Hara et al. | | 5,419,424 A | 5/1995 | Harbaugh |
| 5,040,226 A | 8/1991 | Elischer et al. ................... 382/7 | | 5,421,443 A | 6/1995 | Hatamachi et al. |
| 5,047,871 A | 9/1991 | Meyer et al. | | 5,430,664 A | 7/1995 | Cargill et al. ................. 194/207 |
| 5,054,621 A | 10/1991 | Murphy et al. | | 5,434,427 A | 7/1995 | Crane et al. |
| 5,055,834 A | 10/1991 | Chiba | | 5,437,357 A | 8/1995 | Ota et al. |
| 5,063,599 A | 11/1991 | Concannon et al. | | 5,438,184 A | 8/1995 | Roberts et al. |
| 5,064,999 A | 11/1991 | Okamoto et al. | | 5,442,162 A | 8/1995 | Armel |
| 5,068,519 A | 11/1991 | Bryce | | 5,444,793 A | 8/1995 | Kelland |
| 5,076,441 A | 12/1991 | Gerlier ........................ 209/534 | | 5,444,794 A | 8/1995 | Uhland ........................... 705/45 |
| 5,091,961 A | 2/1992 | Baus, Jr. | | 5,459,304 A | 10/1995 | Eisenmann |
| 5,097,517 A | 3/1992 | Holt ................... 382/7 | | 5,465,301 A | 11/1995 | Jotcham et al. |
| 5,105,364 A | 4/1992 | Kawamura et al. | | 5,465,821 A | 11/1995 | Akioka |
| 5,105,601 A | 4/1992 | Horiguchi et al. | | 5,467,405 A | 11/1995 | Raterman et al. ............. 382/135 |
| 5,114,381 A | 5/1992 | Ueda et al. | | 5,467,406 A | 11/1995 | Graves et al. ................. 382/135 |
| 5,119,433 A | 6/1992 | Will ............................... 382/138 | | 5,468,941 A | 11/1995 | Sasaki |
| 5,120,944 A | 6/1992 | Kern et al. ..................... 235/379 | | 5,468,971 A | 11/1995 | Ebstein et al. |
| 5,122,754 A | 6/1992 | Gotaas | | 5,469,241 A | 11/1995 | Takahashi et al. .............. 355/64 |
| 5,134,663 A | 7/1992 | Kozlowski | | 5,476,169 A | 12/1995 | Takarada et al. |
| 5,135,115 A | 8/1992 | Miller et al. .................. 209/564 | | 5,481,377 A | 1/1996 | Udagawa et al. |
| 5,144,115 A | 9/1992 | Yoshida ........................... 705/41 | | 5,488,671 A | 1/1996 | Kern ............................ 382/138 |
| 5,146,067 A | 9/1992 | Sloan et al. | | 5,491,325 A | 2/1996 | Huang et al. .................... 705/45 |
| 5,146,512 A | 9/1992 | Weideman et al. | | 5,504,822 A | 4/1996 | Holt .............................. 382/218 |
| 5,151,607 A | 9/1992 | Crane | | 5,506,691 A | 4/1996 | Bednar et al. ................. 358/402 |
| 5,154,272 A | 10/1992 | Nishiumi et al. | | 5,509,692 A | 4/1996 | Oz .................................. 283/70 |
| 5,159,548 A | 10/1992 | Caslavka | | D369,984 S | 5/1996 | Larsen ........................... D10/97 |
| 5,163,672 A | 11/1992 | Mennie ......................... 271/187 | | 5,523,575 A | 6/1996 | Machida et al. |
| 5,163,868 A | 11/1992 | Adams et al. | | 5,530,772 A | 6/1996 | Storey |
| 5,167,313 A | 12/1992 | Dobbins et al. | | 5,530,773 A | 6/1996 | Thompson |
| 5,179,517 A | 1/1993 | Sarbin et al. | | 5,537,486 A | 7/1996 | Stratigos et al. .............. 382/137 |
| 5,183,142 A | 2/1993 | Katchinian et al. | | 5,544,043 A | 8/1996 | Miki et al. .................... 364/406 |
| 5,184,115 A | 2/1993 | Black et al. | | 5,544,086 A | 8/1996 | Davis et al. |
| 5,184,709 A | 2/1993 | Nishiumi et al. | | 5,545,885 A | 8/1996 | Jagielinski |
| 5,186,334 A | 2/1993 | Fukudome et al. | | 5,564,546 A | 10/1996 | Molbak et al. |
| 5,187,750 A | 2/1993 | Behera ............................. 382/7 | | 5,586,036 A | 12/1996 | Pintsov |
| 5,191,525 A | 3/1993 | LeBrun et al. ................ 715/500 | | 5,590,196 A | 12/1996 | Moreau ........................... 380/18 |
| 5,193,121 A | 3/1993 | Elischer et al. | | 5,592,377 A | 1/1997 | Lipkin ........................... 395/242 |
| 5,198,976 A | 3/1993 | Form et al. | | 5,592,561 A | 1/1997 | Moore ............................ 382/103 |
| 5,199,543 A | 4/1993 | Kamagami et al. ........... 194/207 | | 5,594,225 A | 1/1997 | Botvin ........................... 235/379 |
| 5,201,395 A | 4/1993 | Takizawa et al. | | 5,600,704 A | 2/1997 | Ahlberg et al. |
| 5,207,788 A | 5/1993 | Geib ............................... 271/122 | | 5,600,732 A | 2/1997 | Ott et al. |
| 5,220,501 A | 6/1993 | Lawlor et al. | | 5,602,933 A | 2/1997 | Blackwell et al. ............. 382/116 |
| 5,231,381 A | 7/1993 | Duwaer | | 5,602,936 A | 2/1997 | Green et al. ................... 382/140 |
| 5,237,158 A | 8/1993 | Kern et al. | | 5,607,040 A | 3/1997 | Mathurin, Sr. |
| 5,237,159 A | 8/1993 | Stephens et al. ............... 235/379 | | 5,615,280 A | 3/1997 | Izawa et al. ................... 382/135 |
| 5,239,593 A | 8/1993 | Wittner et al. | | 5,616,902 A | 4/1997 | Cooley |
| 5,251,738 A | 10/1993 | Dabrowski | | 5,620,079 A | 4/1997 | Molbak |
| 5,252,811 A | 10/1993 | Henochowicz et al. ....... 235/379 | | 5,633,949 A | 5/1997 | Graves et al. ................. 382/135 |
| 5,261,518 A | 11/1993 | Bryce | | 5,640,463 A | 6/1997 | Csulits ........................... 382/135 |
| 5,265,008 A | 11/1993 | Benton et al. ................... 705/44 | | 5,652,802 A | 7/1997 | Graves et al. ................. 382/135 |
| 5,272,641 A | 12/1993 | Shabatake ..................... 370/392 | | 5,657,846 A | 8/1997 | Schwartz |
| 5,274,641 A | 12/1993 | Shobalake et al. | | 5,671,282 A | 9/1997 | Wolff et al. |
| 5,279,403 A | 1/1994 | Harbaugh et al. | | 5,678,046 A | 10/1997 | Cahill et al. ................... 395/616 |
| 5,286,954 A | 2/1994 | Sato et al. | | 5,680,472 A | 10/1997 | Conant ........................... 382/135 |
| 5,295,196 A | 3/1994 | Raterman et al. ................. 382/7 | | 5,687,963 A | 11/1997 | Mennie .......................... 271/119 |
| 5,297,030 A | 3/1994 | Vassigh et al. | | 5,692,067 A | 11/1997 | Raterman et al. ............. 382/135 |
| 5,299,977 A | 4/1994 | Mazur et al. | | 5,704,491 A | 1/1998 | Graves ........................... 209/534 |
| 5,304,813 A | 4/1994 | DeMan | | 5,719,948 A | 2/1998 | Liang |
| 5,308,992 A | 5/1994 | Crane et al. | | 5,724,438 A | 3/1998 | Graves ........................... 382/135 |
| 5,309,515 A | 5/1994 | Troung et al. | | 5,727,667 A | 3/1998 | Nye |
| 5,317,140 A | 5/1994 | Dunthorn | | 5,729,623 A | 3/1998 | Omatu et al. |
| 5,321,238 A | 6/1994 | Kamata et al. | | 5,751,840 A | 5/1998 | Raterman et al. ............. 382/135 |
| 5,335,292 A | 8/1994 | Lovelady et al. | | 5,751,842 A | 5/1998 | Riach et al. ................... 382/137 |
| 5,341,408 A | 8/1994 | Melcher et al. | | 5,754,673 A | 5/1998 | Brooks et al. ................. 382/112 |
| 5,342,165 A | 8/1994 | Graef et al. | | 5,761,089 A | 6/1998 | McInerny |
| 5,363,949 A | 11/1994 | Matsubayashi ................ 194/206 | | 5,781,654 A | 7/1998 | Carney |
| 5,367,577 A | 11/1994 | Gotaas | | 5,790,693 A | 8/1998 | Graves et al. ................. 382/135 |
| 5,368,147 A | 11/1994 | Menke et al. | | 5,790,697 A | 8/1998 | Jones et al. ................... 382/135 |
| 5,371,345 A | 12/1994 | LeStrange et al. | | 5,799,767 A | 9/1998 | Molbak |
| 5,371,798 A | 12/1994 | McWhortor ..................... 380/51 | | 5,806,650 A | 9/1998 | Mennie et al. ................. 194/206 |
| 5,373,550 A | 12/1994 | Campbell et al. ............. 379/100 | | 5,813,510 A | 9/1998 | Rademacher ................. 194/206 |
| 5,379,344 A | 1/1995 | Larson et al. | | 5,815,592 A | 9/1998 | Mennie et al. ................. 382/135 |

| | | | | | | | |
|---|---|---|---|---|---|---|---|
| 5,822,448 | A | 10/1998 | Graves et al. ............... 382/135 | 6,516,078 | B1 | 2/2003 | Yang et al. |
| 5,830,054 | A | 11/1998 | Petri | 6,539,104 | B1 | 3/2003 | Raterman et al. ............ 382/135 |
| 5,832,104 | A | 11/1998 | Graves et al. ............... 382/135 | 6,546,351 | B1 * | 4/2003 | Haycock et al. .............. 702/127 |
| 5,832,463 | A | 11/1998 | Funk ............................. 705/35 | 6,550,671 | B1 | 4/2003 | Brown et al. |
| 5,842,188 | A | 11/1998 | Ramsey et al. | 6,560,355 | B2 | 5/2003 | Graves et al. ................ 382/135 |
| 5,852,811 | A | 12/1998 | Atkins | 6,573,983 | B1 | 6/2003 | Laskowski ..................... 356/71 |
| 5,867,589 | A | 2/1999 | Graves et al. ............... 382/135 | 6,588,569 | B1 | 7/2003 | Hallowell et al. ............. 194/206 |
| 5,870,487 | A | 2/1999 | Graves et al. ............... 382/135 | 6,601,687 | B1 | 8/2003 | Jenrick et al. ................. 194/206 |
| 5,870,725 | A | 2/1999 | Bellinger et al. ............. 705/45 | 6,603,872 | B2 | 8/2003 | Jones et al. ................... 382/135 |
| 5,875,259 | A | 2/1999 | Mennie et al. ............... 382/135 | 6,621,919 | B2 | 9/2003 | Mennie et al. ................ 382/135 |
| 5,892,211 | A | 4/1999 | Davis et al. | 6,628,816 | B2 | 9/2003 | Mennie et al. ................ 382/135 |
| 5,894,937 | A | 4/1999 | Schmidt | 6,636,624 | B2 | 10/2003 | Raterman et al. ............ 382/135 |
| 5,905,810 | A | 5/1999 | Jones et al. ................... 382/135 | 6,637,576 | B1 | 10/2003 | Jones et al. |
| 5,909,502 | A | 6/1999 | Mazur .......................... 382/135 | 6,647,136 | B2 | 11/2003 | Jones et al. ................... 382/137 |
| 5,909,503 | A | 6/1999 | Graves et al. ............... 382/135 | 6,650,767 | B2 | 11/2003 | Jones et al. ................... 382/135 |
| 5,912,982 | A | 6/1999 | Munro et al. ................ 382/135 | 6,654,486 | B2 | 11/2003 | Jones et al. ................... 382/135 |
| 5,917,930 | A * | 6/1999 | Kayani et al. ................ 382/135 | 6,661,910 | B2 | 12/2003 | Jones et al. ................... 382/135 |
| 5,918,748 | A | 7/1999 | Clark et al. | 6,665,431 | B2 | 12/2003 | Jones et al. ................... 382/135 |
| 5,923,413 | A | 7/1999 | Laskowski ..................... 356/71 | 6,678,401 | B2 | 1/2004 | Jones et al. ................... 382/135 |
| 5,926,392 | A | 7/1999 | York et al. .................... 700/223 | 6,678,402 | B2 | 1/2004 | Jones et al. ................... 382/135 |
| 5,926,550 | A | 7/1999 | Davis | 6,697,511 | B1 * | 2/2004 | Haycock ....................... 382/135 |
| 5,930,778 | A | 7/1999 | Geer ............................. 705/45 | 6,705,470 | B2 | 3/2004 | Klein et al. ................... 209/534 |
| 5,936,219 | A | 8/1999 | Yoshida et al. | 6,721,442 | B1 | 4/2004 | Mennie et al. ................ 382/135 |
| 5,938,044 | A | 8/1999 | Weggesser .................... 209/534 | 6,724,926 | B2 | 4/2004 | Jones et al. ................... 382/135 |
| 5,940,623 | A | 8/1999 | Watts et al. .................. 395/712 | 6,724,927 | B2 | 4/2004 | Jones et al. ................... 382/135 |
| 5,940,844 | A | 8/1999 | Cahill et al. .................. 715/526 | 6,731,785 | B1 | 5/2004 | Mennie et al. ................ 382/135 |
| 5,943,655 | A | 8/1999 | Jacobson ....................... 705/30 | 6,731,786 | B2 | 5/2004 | Jones et al. ................... 382/135 |
| 5,947,255 | A | 9/1999 | Shimada et al. | 6,748,101 | B1 | 6/2004 | Jones et al. ................... 382/135 |
| 5,960,103 | A | 9/1999 | Graves et al. ............... 382/135 | 6,778,693 | B2 | 8/2004 | Jones et al. ................... 382/136 |
| 5,966,456 | A | 10/1999 | Jones et al. ................... 382/135 | 6,786,398 | B1 | 9/2004 | Stinson et al. |
| 5,982,918 | A | 11/1999 | Mennie et al. ............... 382/135 | 6,798,899 | B2 | 9/2004 | Mennie et al. ............. 271/10.09 |
| 5,992,601 | A | 11/1999 | Mennie et al. ............... 194/207 | 6,810,137 | B2 | 10/2004 | Jones et al. ................... 382/137 |
| 6,012,565 | A | 1/2000 | Mazur .......................... 194/207 | 6,843,418 | B2 | 1/2005 | Jones et al. .............. 235/462.01 |
| 6,021,883 | A | 2/2000 | Casanova et al. ............ 194/217 | 6,860,375 | B2 | 3/2005 | Hallowell et al. ............. 194/328 |
| 6,023,684 | A | 2/2000 | Pearson | 6,866,134 | B2 | 3/2005 | Stromme et al. .............. 194/207 |
| 6,026,175 | A | 2/2000 | Munro et al. ................ 382/135 | 6,868,954 | B2 | 3/2005 | Stromme et al. .............. 194/207 |
| 6,028,951 | A | 2/2000 | Raterman et al. ............ 382/135 | 6,880,692 | B1 | 4/2005 | Mazur et al. .................. 194/207 |
| 6,038,553 | A | 3/2000 | Hyde, Jr. ........................ 705/45 | 6,913,130 | B1 | 7/2005 | Mazur et al. .................. 194/207 |
| 6,039,645 | A | 3/2000 | Mazur ............................. 453/10 | 6,913,260 | B2 | 7/2005 | Maier et al. ............... 271/265.04 |
| 6,065,672 | A * | 5/2000 | Haycock ....................... 235/379 | 6,915,893 | B2 | 7/2005 | Mennie ...................... 271/265.04 |
| 6,068,194 | A | 5/2000 | Mazur ........................... 235/492 | 6,929,109 | B1 | 8/2005 | Klein et al. ................... 194/206 |
| 6,072,896 | A | 6/2000 | Graves et al. ............... 382/135 | 7,006,664 | B2 * | 2/2006 | Paraskevakos ................ 382/100 |
| 6,073,744 | A | 6/2000 | Raterman et al. ............ 194/207 | 7,034,324 | B2 | 4/2006 | Voser ............................. 250/556 |
| 6,074,334 | A | 6/2000 | Mennie et al. ................ 493/438 | 7,092,560 | B2 | 8/2006 | Jones et al. ................... 382/135 |
| 6,076,826 | A | 6/2000 | Gerlier et al. ................. 271/274 | 7,158,662 | B2 | 1/2007 | Chiles |
| 6,078,683 | A | 6/2000 | Denison et al. | 7,216,106 | B1 | 5/2007 | Buchanan et al. ............. 705/45 |
| D427,623 | S | 7/2000 | Kuwada et al. | 7,243,773 | B2 | 7/2007 | Bochonok et al. |
| 6,097,834 | A | 8/2000 | Krouse et al. ................ 382/137 | 7,248,730 | B2 | 7/2007 | Matsui et al. ................. 382/135 |
| 6,101,266 | A | 8/2000 | Laskowski et al. ........... 382/135 | 7,269,279 | B2 | 9/2007 | Chiles |
| 6,105,007 | A | 8/2000 | Norris ............................. 705/38 | 7,724,938 | B2 | 5/2010 | Pareskevakos |
| 6,119,946 | A | 9/2000 | Teicher | 2001/0006556 | A1 | 7/2001 | Graves et al. |
| 6,128,402 | A | 10/2000 | Jones et al. ................... 382/135 | 2001/0006557 | A1 | 7/2001 | Mennie et al. ................ 382/135 |
| 6,131,718 | A | 10/2000 | Witschorik | 2001/0015311 | A1 | 8/2001 | Mennie ......................... 194/207 |
| 6,141,438 | A | 10/2000 | Blanchester | 2001/0018739 | A1 | 8/2001 | Anderson et al. .............. 713/176 |
| 6,145,738 | A | 11/2000 | Stinson et al. | 2001/0019624 | A1 | 9/2001 | Raterman et al. ............ 382/135 |
| 6,181,837 | B1 | 1/2001 | Cahill et al. | 2001/0035603 | A1 | 11/2001 | Graves et al. |
| 6,220,419 | B1 | 4/2001 | Mennie ......................... 194/207 | 2001/0053241 | A1 * | 12/2001 | Haycock ....................... 382/135 |
| 6,237,739 | B1 | 5/2001 | Mazur et al. .................. 194/207 | 2002/0001393 | A1 | 1/2002 | Jones et al. ................... 382/135 |
| 6,241,069 | B1 | 6/2001 | Mazur et al. .................. 194/207 | 2002/0020603 | A1 | 2/2002 | Jones et al. |
| 6,256,407 | B1 | 7/2001 | Mennie et al. ................ 382/135 | 2002/0056605 | A1 | 5/2002 | Mazur et al. |
| 6,278,795 | B1 | 8/2001 | Anderson et al. ............. 382/135 | 2002/0082993 | A1 | 6/2002 | Hoyos et al. .................... 705/43 |
| 6,282,523 | B1 | 8/2001 | Tedesco et al. | 2002/0085245 | A1 | 7/2002 | Mennie et al. ................ 382/135 |
| 6,283,366 | B1 | 9/2001 | Hills et al. | 2002/0085745 | A1 | 7/2002 | Jones et al. |
| 6,311,819 | B1 | 11/2001 | Stromme et al. .............. 194/207 | 2002/0103757 | A1 | 8/2002 | Jones et al. ................... 382/135 |
| 6,318,537 | B1 | 11/2001 | Jones et al. ................... 194/346 | 2002/0104785 | A1 | 8/2002 | Klein et al. ................... 209/534 |
| 6,351,551 | B1 | 2/2002 | Munro et al. ................ 382/135 | 2002/0107801 | A1 | 8/2002 | Jones et al. ................... 382/137 |
| 6,351,552 | B1 | 2/2002 | Weaver | 2002/0118871 | A1 | 8/2002 | Jones et al. ................... 382/135 |
| 6,354,491 | B2 | 3/2002 | Nichols et al. | 2002/0122580 | A1 | 9/2002 | Jones et al. ................... 382/135 |
| 6,363,164 | B1 | 3/2002 | Jones et al. ................... 382/135 | 2002/0126885 | A1 | 9/2002 | Mennie et al. |
| 6,371,303 | B1 | 4/2002 | Klein et al. ................... 209/534 | 2002/0126886 | A1 | 9/2002 | Jones et al. ................... 382/135 |
| 6,373,965 | B1 | 4/2002 | Liang ............................ 382/112 | 2002/0131630 | A1 | 9/2002 | Jones et al. ................... 382/135 |
| 6,378,683 | B2 | 4/2002 | Mennie ......................... 194/207 | 2002/0136442 | A1 | 9/2002 | Jones et al. ................... 382/135 |
| 6,381,354 | B1 | 4/2002 | Mennie et al. ............... 382/135 | 2002/0145035 | A1 | 10/2002 | Jones |
| 6,398,000 | B1 | 6/2002 | Jenrick et al. ................. 194/200 | 2002/0154804 | A1 | 10/2002 | Jones et al. ................... 382/135 |
| 6,415,983 | B1 | 7/2002 | Ulvr et al. | 2002/0154805 | A1 | 10/2002 | Jones et al. ................... 382/135 |
| 6,459,806 | B1 | 10/2002 | Raterman et al. ............ 382/135 | 2002/0154806 | A1 | 10/2002 | Jones et al. ................... 382/135 |
| 6,460,705 | B1 | 10/2002 | Hallowell ..................... 209/534 | 2002/0154807 | A1 | 10/2002 | Jones et al. ................... 382/135 |
| 6,473,519 | B1 | 10/2002 | Pidhimy et al. | 2002/0154808 | A1 | 10/2002 | Jones et al. ................... 382/135 |
| 6,493,461 | B1 | 12/2002 | Mennie et al. ............... 382/135 | 2002/0186876 | A1 | 12/2002 | Jones et al. ................... 382/135 |

| Publication No. | Date | Inventor | Class |
|---|---|---|---|
| 2003/0006277 A1 | 1/2003 | Maskatiya et al. | 235/379 |
| 2003/0009420 A1 | 1/2003 | Jones | |
| 2003/0015395 A1 | 1/2003 | Hallowell et al. | 194/206 |
| 2003/0015396 A1 | 1/2003 | Mennie | 194/206 |
| 2003/0059098 A1 | 3/2003 | Jones et al. | |
| 2003/0062242 A1 | 4/2003 | Hallowell et al. | |
| 2003/0080032 A1 | 5/2003 | Heidel et al. | 209/534 |
| 2003/0081824 A1 | 5/2003 | Mennie et al. | |
| 2003/0099379 A1 | 5/2003 | Monk et al. | 382/115 |
| 2003/0108233 A1 | 6/2003 | Raterman et al. | |
| 2003/0121752 A1 | 7/2003 | Stromme et al. | 194/207 |
| 2003/0121753 A1 | 7/2003 | Stromme et al. | 194/207 |
| 2003/0132281 A1 | 7/2003 | Jones et al. | |
| 2003/0139994 A1 | 7/2003 | Jones | |
| 2003/0168308 A1 | 9/2003 | Maier et al. | 194/207 |
| 2003/0174874 A1 | 9/2003 | Raterman et al. | |
| 2003/0182217 A1 | 9/2003 | Chiles | |
| 2003/0198373 A1 | 10/2003 | Raterman et al. | |
| 2003/0202690 A1 | 10/2003 | Jones et al. | |
| 2004/0003980 A1 | 1/2004 | Hallowell et al. | |
| 2004/0016621 A1 | 1/2004 | Jenrick et al. | |
| 2004/0016797 A1 | 1/2004 | Jones et al. | 235/462.01 |
| 2004/0028266 A1 | 2/2004 | Jones et al. | |
| 2004/0083149 A1 | 4/2004 | Jones | |
| 2004/0131230 A1* | 7/2004 | Paraskevakos | 382/100 |
| 2004/0145726 A1 | 7/2004 | Csulits et al. | |
| 2004/0149538 A1 | 8/2004 | Sakowski | 194/207 |
| 2004/0153408 A1 | 8/2004 | Jones et al. | |
| 2004/0154964 A1 | 8/2004 | Jones | |
| 2004/0173432 A1 | 9/2004 | Jones | |
| 2004/0182675 A1 | 9/2004 | Long et al. | |
| 2004/0251110 A1 | 12/2004 | Jenrick et al. | |
| 2005/0029168 A1 | 2/2005 | Jones et al. | |
| 2005/0035034 A1 | 2/2005 | Long et al. | |
| 2005/0040225 A1 | 2/2005 | Csulits et al. | |
| 2005/0047642 A1 | 3/2005 | Jones et al. | |
| 2005/0060055 A1 | 3/2005 | Hallowell et al. | |
| 2005/0060059 A1 | 3/2005 | Klein et al. | |
| 2005/0060061 A1 | 3/2005 | Jones et al. | |
| 2005/0077142 A1 | 4/2005 | Tam et al. | |
| 2005/0086271 A1 | 4/2005 | Jones et al. | |
| 2005/0087422 A1 | 4/2005 | Maier et al. | |
| 2005/0108165 A1 | 5/2005 | Jones et al. | |
| 2005/0117791 A2 | 6/2005 | Raterman et al. | |
| 2005/0117792 A2 | 6/2005 | Raterman et al. | 382/135 |
| 2005/0150738 A1 | 7/2005 | Hallowell et al. | |
| 2005/0163361 A1 | 7/2005 | Jones et al. | |
| 2005/0163362 A1 | 7/2005 | Jones et al. | |
| 2005/0169511 A1 | 8/2005 | Jones | 382/135 |
| 2005/0173221 A1 | 8/2005 | Maier et al. | |
| 2005/0183928 A1 | 8/2005 | Jones et al. | |
| 2006/0054454 A1 | 3/2006 | Oh | 194/207 |
| 2009/0013653 A1 | 1/2009 | Sekiguchi | |
| 2009/0148027 A1 | 6/2009 | Paraskevakos | |
| 2009/0183967 A1 | 7/2009 | Hamasaki | |
| 2009/0236200 A1 | 9/2009 | Hallowell et al. | |

FOREIGN PATENT DOCUMENTS

| | | |
|---|---|---|
| DE | 28 24 849 A1 | 12/1979 |
| DE | 298 17 253 | 3/1999 |
| DE | 198 24 435 | 5/1999 |
| EP | 0 030 413 A2 | 6/1981 |
| EP | 0 071 421 | 2/1983 |
| EP | 0 077 464 | 4/1983 |
| EP | 0 083 062 | 7/1983 |
| EP | 0 101 115 | 2/1984 |
| EP | 0 109 743 | 5/1984 |
| EP | 0 185 200 | 6/1986 |
| EP | 0 253 935 | 1/1988 |
| EP | 0 314 312 | 5/1989 |
| EP | 0 325 364 | 7/1989 |
| EP | 0 338 123 | 10/1989 |
| EP | 0 342 647 | 11/1989 |
| EP | 0 402 627 | 12/1990 |
| EP | 0 416 916 | 3/1991 |
| EP | 0 416 960 A2 | 3/1991 |
| EP | 0 473 106 A2 | 3/1992 |
| EP | 0 578 875 | 1/1994 |
| EP | 0 583 526 | 2/1994 |
| EP | 0 583 723 | 2/1994 |
| EP | 0 593 209 | 4/1994 |
| EP | 0 613 107 A1 | 8/1994 |
| EP | 0 616 296 | 9/1994 |
| EP | 0 632 415 A2 | 1/1995 |
| EP | 0 633 533 | 1/1995 |
| EP | 0 633 552 A2 | 1/1995 |
| EP | 0 633 553 A1 | 1/1995 |
| EP | 0 661 654 A2 | 7/1995 |
| EP | 0 671 696 A1 | 9/1995 |
| EP | 0 612 042 A3 | 5/1996 |
| EP | 0 718 809 | 6/1996 |
| EP | 0 718 809 A2 | 6/1996 |
| EP | 0 612 042 B1 | 6/1998 |
| EP | 0 548 142 B2 | 9/1999 |
| EP | 0 708 419 B1 | 1/2000 |
| EP | 0 824 736 B1 | 3/2000 |
| EP | 0 984 410 | 3/2000 |
| EP | 0 686 292 B1 | 7/2000 |
| EP | 1 028 359 | 8/2000 |
| EP | 0 760 987 B1 | 9/2000 |
| EP | 1 041 523 A2 | 10/2000 |
| EP | 1041523 A2 * | 10/2000 |
| EP | 1 134 704 | 9/2001 |
| EP | 1 160 737 | 12/2001 |
| EP | 1 019 869 A1 | 10/2006 |
| EP | 1 004 089 A1 | 10/2007 |
| EP | 1 480 177 B1 | 11/2007 |
| EP | 1 008 096 A2 | 1/2008 |
| FR | 2 539 898 | 7/1984 |
| FR | 2 722 316 | 1/1996 |
| GB | 2 038 063 A | 7/1980 |
| GB | 2 190 996 A | 12/1987 |
| GB | 2 204 166 A | 11/1988 |
| GB | 2 272 762 A | 5/1994 |
| GB | 2 355 522 | 4/2001 |
| GB | 2 464 826 A | 5/2010 |
| JP | 62-220843 A | 9/1987 |
| JP | 63-73497 A | 4/1988 |
| JP | 2-12492 | 1/1990 |
| JP | 4-131986 A | 5/1992 |
| JP | 4-243497 | 8/1992 |
| JP | 6-203248 A | 7/1994 |
| JP | 7-168857 A | 7/1995 |
| WO | WO 85/02148 | 5/1985 |
| WO | 87/06041 A1 | 10/1987 |
| WO | WO 90/07165 | 6/1990 |
| WO | 91/11778 | 8/1991 |
| WO | WO 91/11778 | 8/1991 |
| WO | 92/14221 A1 | 8/1992 |
| WO | 92/17394 A1 | 10/1992 |
| WO | WO 92/16931 | 10/1992 |
| WO | WO 92/17394 | 10/1992 |
| WO | 93/23824 A1 | 11/1993 |
| WO | WO 93/23824 | 11/1993 |
| WO | WO 94/06102 | 3/1994 |
| WO | 94/16412 A1 | 7/1994 |
| WO | 94/19773 A1 | 9/1994 |
| WO | WO 95/10088 | 4/1995 |
| WO | 95/19019 A2 | 7/1995 |
| WO | 95/24691 A1 | 9/1995 |
| WO | WO 95/24691 | 9/1995 |
| WO | 96/03719 A1 | 2/1996 |
| WO | 96/10800 A1 | 4/1996 |
| WO | WO 96/10800 | 4/1996 |
| WO | 96/29683 A1 | 9/1996 |
| WO | 96/36933 A1 | 11/1996 |
| WO | WO 96/36933 | 11/1996 |
| WO | 97/05583 A1 | 2/1997 |
| WO | 97/29459 A1 | 8/1997 |
| WO | 97/30422 A1 | 8/1997 |
| WO | WO 97/30422 | 8/1997 |
| WO | WO 97/43734 | 11/1997 |
| WO | WO 97/45810 | 12/1997 |
| WO | WO 98/12662 | 3/1998 |
| WO | WO 98/13785 | 4/1998 |
| WO | 98/24041 A1 | 6/1998 |
| WO | WO 98/24052 | 6/1998 |
| WO | WO 98/24067 | 6/1998 |

| | | |
|---|---|---|
| WO | WO 98/26364 | 6/1998 |
| WO | WO 98/35323 | 8/1998 |
| WO | WO 98/40839 | 9/1998 |
| WO | 98/48383 A2 | 10/1998 |
| WO | 98/48384 A2 | 10/1998 |
| WO | 98/48385 A2 | 10/1998 |
| WO | WO 98/47100 | 10/1998 |
| WO | 98/51082 A1 | 11/1998 |
| WO | WO 98/50892 | 11/1998 |
| WO | WO 98/59323 | 12/1998 |
| WO | 99/00776 A1 | 1/1999 |
| WO | WO 99/09511 | 2/1999 |
| WO | WO 99/14668 | 3/1999 |
| WO | WO 99/23601 | 5/1999 |
| WO | WO 99/41695 | 8/1999 |
| WO | WO 99/48040 | 9/1999 |
| WO | WO 99/48042 | 9/1999 |
| WO | 99/50795 A1 | 10/1999 |
| WO | WO 99/50796 | 10/1999 |
| WO | WO 00/05688 | 2/2000 |
| WO | WO 00/24572 | 5/2000 |
| WO | 00/58876 A1 | 10/2000 |
| WO | WO 00/58876 | 10/2000 |
| WO | WO 00/70540 | 11/2000 |
| WO | WO 01/08108 | 2/2001 |
| WO | WO 01/59685 | 8/2001 |
| WO | WO 01/59723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |
| WO | WO 03/029913 | 4/2003 |
| WO | WO 03/030113 | 4/2003 |
| WO | WO 03/067532 | 8/2003 |
| WO | WO 03/107282 | 12/2003 |
| WO | WO 2004/010367 | 1/2004 |
| WO | WO 2004/027717 | 4/2004 |
| WO | WO 2004/036508 | 4/2004 |
| WO | WO 2004/038631 | 5/2004 |
| WO | WO 2004/068422 | 8/2004 |
| WO | WO 2005/013209 A2 | 2/2005 |
| WO | WO 2005/017842 A1 | 2/2005 |
| WO | WO 2005/029240 A2 | 3/2005 |
| WO | WO 2005/036445 A1 | 4/2005 |
| WO | 2005/041134 A2 | 5/2005 |
| WO | WO 2005/041134 A2 | 5/2005 |
| WO | WO 2005/076229 A1 | 8/2005 |

OTHER PUBLICATIONS

U.S. Appl. No. 09/611,279, filed Jul. 6, 2000, Method for Document Processing.
U.S. Appl. No. 09/655,481, filed Sep. 5, 2000, Method and Apparatus for Discriminating and Counting Documents.
U.S. Appl. No. 09/684,103, filed Oct. 5, 2000, Method and Apparatus for Document Identification and Authentication.
U.S. Appl. No. 10/264,338, filed Oct. 3, 2002, Automatic Currency Processing System.
U.S. Appl. No. 10/263,622, filed Oct. 3, 2002, Automatic Currency Processing System.
U.S. Appl. No. 10/853,021, filed May 25, 2004, An Automated Document Processing System Using Full Image Scanning.
U.S. Appl. No. 11/048,416, filed Feb. 1, 2005, Automated Document Processing System And Method Using Image Scanning.
U.S. Appl. No. 11/048,296, filed Feb. 1, 2005, Automated Document Processing System and Method Using Full Image Scanning.
U.S. Appl. No. 11/057,825, filed Feb. 14, 2005, Method and Apparatus for Discriminating and Counting Documents.
U.S. Appl. No. 11/137,295, filed May 24, 2005, Currency Processing Device.
U.S. Appl. No. 11/194,380, filed Aug. 1, 2005, Document Processing System Using Full Image Scanning.
U.S. Appl. No. 11/198,065, filed Aug. 5, 2005, Document Processing System Using Full Image Scanning.
U.S. Appl. No. 11/199,511, filed Aug. 8, 2005, Document Processing System Using Full Image Scanning.

European Patent Office, "Written Opinion of the International Searching Authority," dated Dec. 29, 2004, International Application No. PCT/US2004/022397, filed Jul. 14, 2004.
International Search Report, PCT/US2004/022397, dated Dec. 17, 2004.
Discussion of FR 2 722 316 in European Patent Office, Communication pursuant to Article 96(2), EP 04 020 193.1, Jul. 18, 2005, 4 pages.
European Search Report dated Nov. 9, 2007 for PCT/US02/30157 (EP 02 79 9607), 4 pages.
Brochure for Shinwoo Banking Machin; downloaded on Mar. 30, 2009; 2 pages.
Brochure for SB-1000 Currency Discrimination Counter with Enhanced Image Recognition Technology; downloaded on Mar. 30, 2009; 1 page.
Brochure for MLS Bank Machine downloaded on Mar. 30, 2009; 4 pages.
Web pages for SB 5000 (Digital Fitness Sorter) downloaded on Mar. 30, 2009; 3 pages.
Web pages for SB 1000 (Currency Discrimination Counter; downloaded on Mar. 30, 2009; 3 pages.
Brochure for SBM Banking Machine SB Series; down loaded on Mar. 30, 2009; 2 pages.
AFB Currency Recognition System (1982).
Barton, Louis L., "Check Processing Operations," Chapter 8 and Appendix 2, pp. 119-140 and 225-231 (1994).
Brandt, Mach 7 High-Speed Coin Sorter/Counter, 2 pages (Apr. 1, 1993).
Brandt, Model 8904 Upfeed, High Speed 4-Denomination Currency Dispenser, 2 pages (date prior to May 1996).
Cash Depositing System CDS 5700 and CDS 5800 (Jan. 3, 1995, with translation).
Cash Receipt System CRS/6501/CRS6510, IREIS (Feb. 1995).
Contomat (date prior to May 13, 1996).
Cummins-Allison Corp., Operating Instructions for JetScan Currency Scanner/Counter, Model 4061 (Apr. 20, 1993).
Cummins-Allison Corp., Operating Instructions for JetScan Currency Scanner/Counter, Model 4062 (Nov. 28, 1994).
Cummins-Allison Corp., Operating Instructions for JetSort® High Speed Sorter/Counter (Kits I & J), 11 pages (1993).
Cummins-Allison Corp., Operator's manual for JetScan Currency Scanner/Counter, Model 4060 (Aug. 1991).
Cummins-Allison Corp., Sale of JetScan Currency Scanner/Counter, Model 4060 (Aug. 1991).
Cummins-Allison Corp., Sale of JetScan Currency Scanner/Counter, Model 4061 (Apr. 20, 1993).
Cummins-Allison Corp., Sale of JetScan Currency Scanner/Counter, Model 4062 (Nov. 28, 1994).
Currency Systems International, CPS 600 CPS 900 (estimated 1994).
Currency Systems International, Medium Speed Currency Sorting Family, CPS 600 and CPS 900, 4 pages (1994).
Currency Systems International, Mr. W. Kranister in Conversation With Richard Haycock, pp. 1-5 (estimated 1994).
Currency Systems International/Currency Processing Systems, CPS 300, 4 pages (1992).
DeLaRue Gamy GmBH, Cash Deposing Systems CDS 5700 and CDS 5800 (date unknown, with translation).
Elston, Cassius, "No More Lines . . . Self Serve Cash-Out," Drop Stream Developments, p. 3 (date prior to May 13, 1996).
Glory, General Catalog of Products, System 8000 at p. 5 (1996, with translation).
Glory, GFB-200/210//220/230, Desk-Top Bank Note Counter, 2 pages (estimated date prior to Aug. 9, 1994).
Glory, GSA-500 Sortmaster, 2 pages (Jan. 14, 1994).
Glory, The New CRS-8000 Cash Redemption System (date prior to May 13, 1996).
Glory, UF-1D, 2 pages (estimated date prior to Aug. 9, 1994).
ISH 12005/500 SB-Münzähler (date prior to May 13, 1996, with translation).
Mosler, Inc. "The Mosler/Toshiba CF-420" (1989).
NGZ 2100 (date prior to May 13, 1996).
PREMA 405(RE) Self Service Coin Deposit Facility (date prior to May 13, 1996).

Scan Coin CDS 600 Cash Deposit System (Jun. 15, 1994).
Scan Coin CDS 640 Cash Deposit System (Jun. 15, 1994).
Toshiba-Mosler, CF-420 (estimated 1989).
Toshiba-Mosler, Operator's Manual for CF-420 Cash Settlement System, pp. 1-C-3 (1989).
Toshiba-Mosler, revised drawings of portions of CF-420 Cash Management System (Figs. A-C) and description of same (1989).
European Search Report dated Nov. 9, 2007 for PCT/US02/30157 (E 02 79 9607), 4 pages.
ACI-1 Applied Communications Inc.: BASE24 software, "Applied Communications Announces Joint Venture," Business Wire, 3 pages (Jan. 6, 1989).
ASCOM: Cashflow Emerald, 2 pages (date unknown).
ATM Cardpay Corp: "ATM Cardpay Introduces New Bill Payment Idea," Retail Delivery Systems New, vol. 3, Iss. 1, p. 1; 2 pages. (Jan. 16, 1998).
ATM Cardpay Corp: "The Next Generation of ATM Network Survival." ATM Cardpay Shows Switches How To Win Bill Presentment/Payment Market, vol. 20, Iss. 17; 3 pages (date Aug. 27, 1997.
Elcom International Inc: "Elcom.com and Visa Announces Systems Link to Offer B2B Ecommerce Solutions," 4 pages (date Nov. 29, 1999).
ISH Electronic: ISH I2005/501 Self-Service Unit (with transition), 4 pages (date unknown, prior to Aug. 1996).
J&B Software Inc.: "J&B Software Announces New Successes for TMS Image™ Remittance, " 2 pages (date Mar. 23,1998).
Perconta: Cassomat A.C.S. Automated Cash System Types I and II, 6 pages (date unknown).
ShieldSpec LLC, Presentation on Currency Manager for Law Enforcement, 10 pages (downloaded from www.shieldspec.com/documents/CurrenyManagerLawEnforcement.pdf on Aug. 18, 2010), © 2005.
ShieldSpec LLC, Currency Manager for Law Enforcement, 1 page (downloaded from www.shieldspec.com/product.html on Aug. 18, 2010).
Vector Tech; Document Imaging; Product Demonstration video (Jun. 1996).

* cited by examiner

CURRENCY BILL TRACKING SYSTEM

PRIORITY CLAIM

The present application is a continuation-in-part of U.S. application for patent Ser. No. 09/965,428 filed Sep. 27, 2001, now U.S. Pat. No. 7,187,795 the disclosure of which is hereby incorporated by reference.

FIELD OF THE INVENTION

The field of the invention relates generally to a currency bill processing system and, more specifically, to a system whereby information is extracted from currency bills for the purpose of tracking and tracing.

BACKGROUND OF THE INVENTION

Criminal enterprises often conduct their financial transactions using currency bills. The reasons for this are well known to law enforcement agencies. The most important reason is that cash transactions are exceedingly difficult for law enforcement agencies to track and trace. This gives the criminal enterprise some level of freedom to conduct the financial side of their "business" without fear of governmental inspection. A need accordingly exists to better assist law enforcement in monitoring individual, business and enterprise use of currency bills in a manner that allows for the tracking and tracing of currency flowing into and out of the accounts of criminal suspects.

SUMMARY OF THE INVENTION

In one embodiment of the present invention, method and device are claimed for scanning currency bills. Currency bills are received. An identifier for a transaction involving one or more of the received currency bills is obtained. The currency bills are then scanned to obtain an image of at least one side of a received currency bill. A serial number of the received currency bill is then extracted from the image. A data file is then created which links the extracted serial numbers for the currency bills involved in the transaction to the identifier for the transaction to allow for the involved currency bills to be subsequently traced by serial number to that transaction.

In another embodiment of the present invention, method and device are claimed for distributing (for example, withdrawing) currency bills. An identifier for a currency bill distribution transaction is obtained. A distribution of a number of currency bills for that transaction is then made. Each distributed currency bill is scanned to obtain a currency bill serial number. The serial number(s) for the distributed currency bill(s) are then linked to the transaction identifier so as to allow the distributed currency bills to be traced to a certain transaction by their serial number.

In another embodiment of the present invention, method and device are claimed for receiving (for example, depositing) currency bills. An identifier for a currency bill reception transaction is obtained. A reception of a number of currency bills for that transaction is then made. Each received currency bill is scanned to obtain a currency bill serial number. The serial number(s) for the received currency bill(s) are then linked to the transaction identifier so as to allow the received currency bills to be traced to a certain transaction by their serial number.

BRIEF DESCRIPTION OF THE DRAWINGS

The foregoing and other advantages of the invention will become apparent upon reading the following detailed description and upon reference to the following drawings.

DESCRIPTION OF ILLUSTRATIVE EMBODIMENTS

The term "currency bills" refers to official currency bills including both U.S. and foreign currency. It also refers to bills, promotional media, substitute currency media or documents issued by casinos (e.g., casino script, casino tickets, cashout vouchers, coupons and the like such as "EZ Pay" tickets or "Quiket" tickets), other private entities such as "DISNEY DOLLARS®" (a registered trademark of Walt Disney Enterprises of Burbank, Calif.) or "GEOFFREY DOLLARS®" (a registered trademark of Toys 'R US), and entities which utilize bar coded transaction records (such as casino tickets, cashout tickets, retailer coupons, gift certificates and the like).

Figure 1:
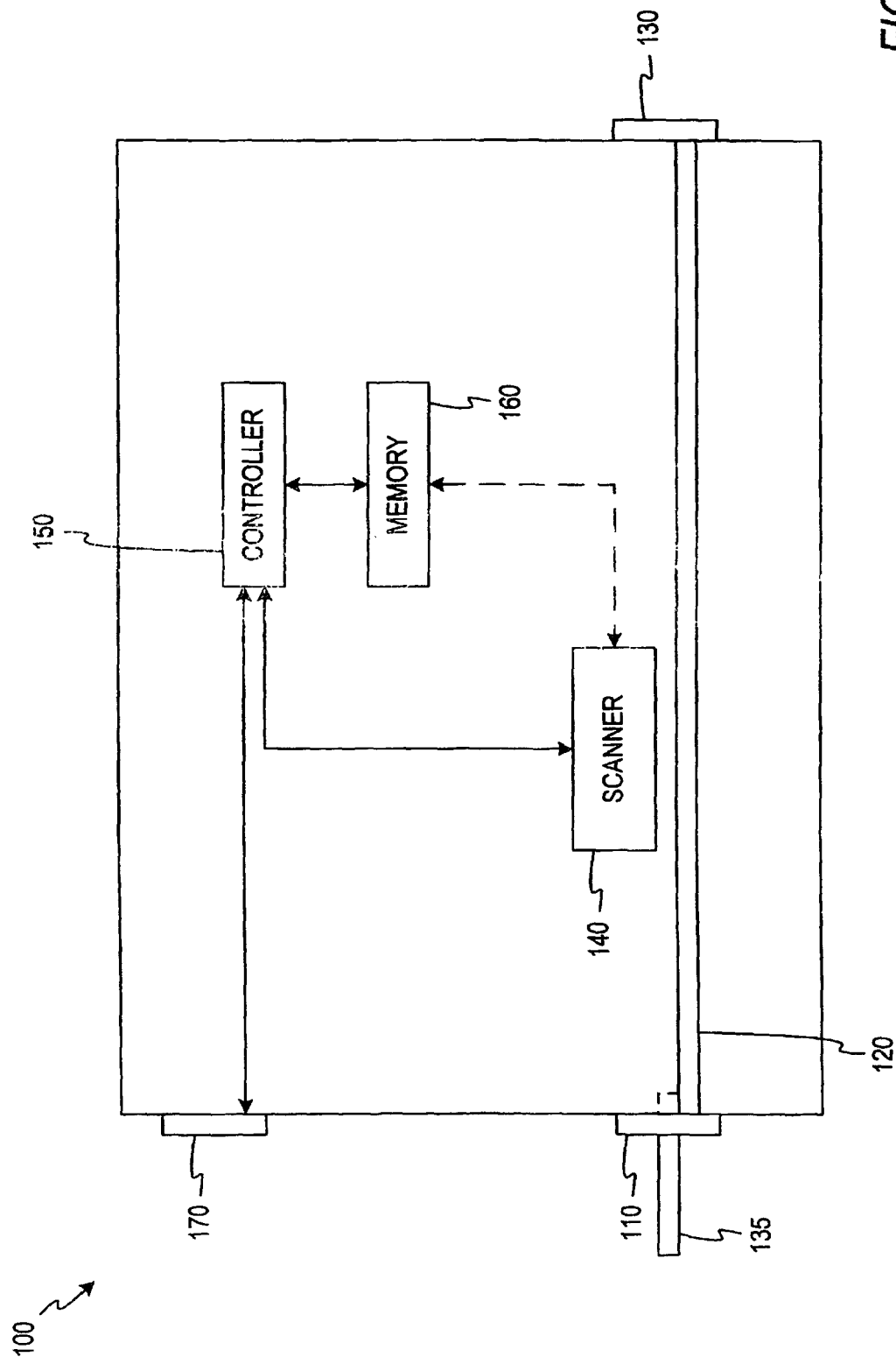
FIG. 1 is a block diagram of a document scanning device according to one embodiment of the present invention.

Reference is now made to FIG. 1, wherein there is shown a block diagram of a document scanning device 100 according to one embodiment of the present invention. The document scanning device 100 includes an input receptacle 110, a transport mechanism 120, and an output receptacle 130. For ease of illustration, only one input receptacle 110 and one output receptacle 130 are shown in this drawing. The document scanning device 100 may, however, include any number of input receptacles 110 and output receptacles 130 as desired.

An operator inserts a currency bill 135 (or stack of currency bills) into the input receptacle 110. In this application, the term "operator" refers to someone who uses the device 100 and can include, for example, a bank customer, a bank employee, a casino patron, a casino employee, a retail customer, a retail employee, and the like. The document scanning device 100 may be used in a variety of situations with a variety of operators. For example, the document scanning device 100 may be used as a stand-alone customer device, like an Automated Teller Machine (ATM), in which the operator is a customer who uses the device to process currency bills. In another embodiment, the document scanning device 100 may be a semi-attended device, like a point of sale machine, where both a customer and an employee use the device. In another alternative embodiment, the document scanning device 100 may be a stand-alone entity device, like a bank or financial institution teller machine, used only by employees.

As stated above, the document scanning device 100 may receive one currency bill or may receive a stack of currency bills into the input receptacle 110. The transport mechanism 120 is coupled to the input receptacle 110 and is adapted to transport the received currency bill(s) 135, one at a time, through the document scanning device 100, past a scanner 140 and to the output receptacle 130. A controller 150 is linked to the scanner 140, the transport mechanism 120, a memory 160, and an operator control panel 170. The controller is adapted to control the operation of the transport mechanism 120 and the scanner 140, communicate information to and from the memory 160, and to communicate information to and from the operator control panel 170. For example, the controller 150 may send display information to and receive operator input from the operator control panel 170.

Responsive to controller 150 command, the scanner 140 scans each passing currency bill 135 to produce scan data from which certain information of interest may be obtained. As an example, the scanner may be an imager like that shown in U.S. Pat. No. 6,363,164, the disclosure of which is hereby incorporated by reference, to optically scan each currency bill to obtain scan data in the form of a bill image (of either or both sides of the bill). The bill image may be an image of substantially the entire currency bill 135 (a "full image") or of selected portions (a "partial image") of the currency bill 135.

The scanner 140 further contains an optical processing functionality (for example, an optical character recognition (OCR) capabilities) for processing the image (full or partial) to identify the certain information of interest (although such optical processing functionalities can instead be implemented in the controller 150, if desired). For example, the identified information of interest may comprise the characters printed in one or more fields of the currency bills (as identified by the OCR capability). The identified information of interest may also comprise printed features, patterns or relationships on the currency bills (as identified through optical signal processing techniques).

As a specific example, the OCR capability may recognize certain fields within the currency bill 135. For example, the OCR may search the full or partial image for a serial number of the currency bill and extract the serial number once the field is located.

The imager/OCR implementation discussed above is not the only possible implementation for the scanner 140 of the device 100. Other technological options for scanning the currency bill(s) and extracting the certain information of interest are known to those skilled in the art. For example, instead of imaging all or a portion of the currency bill(s), the scanner 140 may instead implement a line or strip reflective scanning operation like that disclosed in U.S. Pat. Nos. 5,815, 592 and 5,982,918, the disclosures of which are incorporated herein by reference, to obtain scan data in the form of printed surface feature information (from detected reflectance data). Appropriate signal processing techniques, such as software-based pattern recognition algorithms, can then be applied to the collected information (the scan data) by either the scanner or the controller in order to discern the printed features as the information of interest (for example, serial numbers, line widths, line directions, line relationships, and the like).

Other scanning modules and methods can be used in place of or in addition to the ones described above. These include CCD array systems, multi-cell arrays, contact image sensing, CMOS image sensors, and other well-known scanning techniques. Examples of these techniques and devices are described in U.S. Pat. Nos. 5,023,782, 5,237,158, 5,187,750, and 4,205,780, all of which are incorporated herein by reference in their entireties. The scanning module can also be a color image scanner such as the type described in U.S. Pat. No. 5,335,292, which is incorporated herein by reference in its entirety.

The information of interest collected from each scanned currency bill is then saved in the memory 160. This information may be managed by a processing functionality for storage by and through the controller 150. Alternatively, the scanner 140 may be linked for data transfer and delivery of information directly to the memory 160.

In one embodiment of the invention, wherein the scanner 140 operates to collect currency bill images, the collected images are passed to the memory 160 and stored therein. The determined information of interest is also stored in the memory 160 in association with its corresponding image using a process of tagging the information of interest as data to the image file. This will be discussed in more detail below.

In another embodiment of the invention, wherein currency bill images are not necessarily collected, the determined information of interest is stored in the memory 160 in a data file. This will be discussed in more detail below.

In either case, the information of interest is linked in some form or fashion known to those skilled in the art (for example, by database association) to other information and, if applicable, to the bill image.

Where the memory 160 is used to store the images of the currency bill 135 scanned by the scanner 140, the memory 160 may store the currency bill as a full image of the currency bill 135 (a picture of the entire bill 135). Alternatively, the memory 160 may only store an image of a portion of the currency bill 135 (a partial picture of the bill 135). It may be that the memory 160 only needs to store an image of half of the currency bill 135 in order to obtain the fields needed for a given application. In another embodiment, the memory 160 may only store data for a strip of the currency bill 135.

Figure 2:
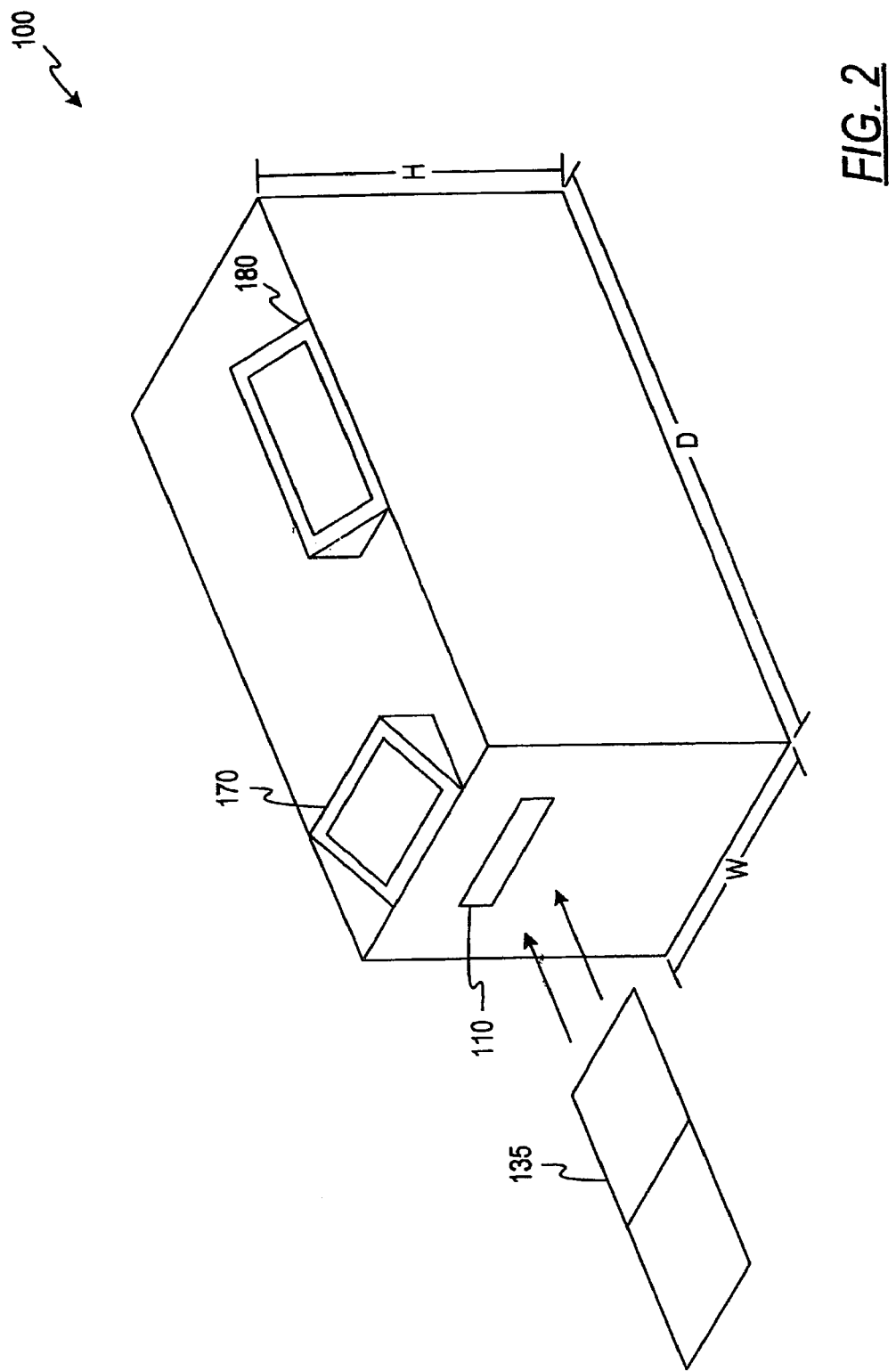
FIG. 2 is a perspective view of a document scanning device according to one embodiment of the present invention.

Turning now to FIG. 2, a perspective view of the document scanning device 100 is illustrated. In this particular embodiment, the document scanning device 100 includes an additional control panel 180 (comprising a customer control panel) for receiving and displaying information. The customer control panel 180 may be used by a person who is not necessarily an operator of the device 100. This may be better understood by reference to an example. Suppose the device 100 is associated with a bank or financial institution. The operator control panel 170 is provided for use by a bank employee, such as a teller or service technician, while the customer control panel 180 is provided for use by the bank customer (who may be engaging in either a currency deposit or withdrawal activity). It will of course be understood that the operator control panel 170 in this example need not be manned at each instance of a customer use (this is especially true in situations where the device 100 is a stand-alone device such as an ATM). As another example, suppose the device is associated with a merchant. The operator control panel 170 is provided for use by a merchant employee, such as a cashier, while the customer control panel 180 is provided for use by the merchant customer (who may be paying with currency bills or receiving currency bills as change).

The document scanning device 100 is preferably sized to be rested on a tabletop. According to one embodiment associated with such a device having a single output receptacle, the document scanning device is compact, having a height of about 9½ to 12½ inches, a width of about 11 to 15 inches, and a depth of about 12 to 16 inches. According to one embodiment associated with such a device having two or more output receptacles, the document scanning device is compact, having a height of about 17½ inches, a width of about 13½ inches, and a depth of about 15 inches. According to yet another multiple output pocket embodiment, the document scanning device has dimensions of a height of about 20 inches, a width of about 15 inches, and a depth of about 18 inches.

Figure 3:
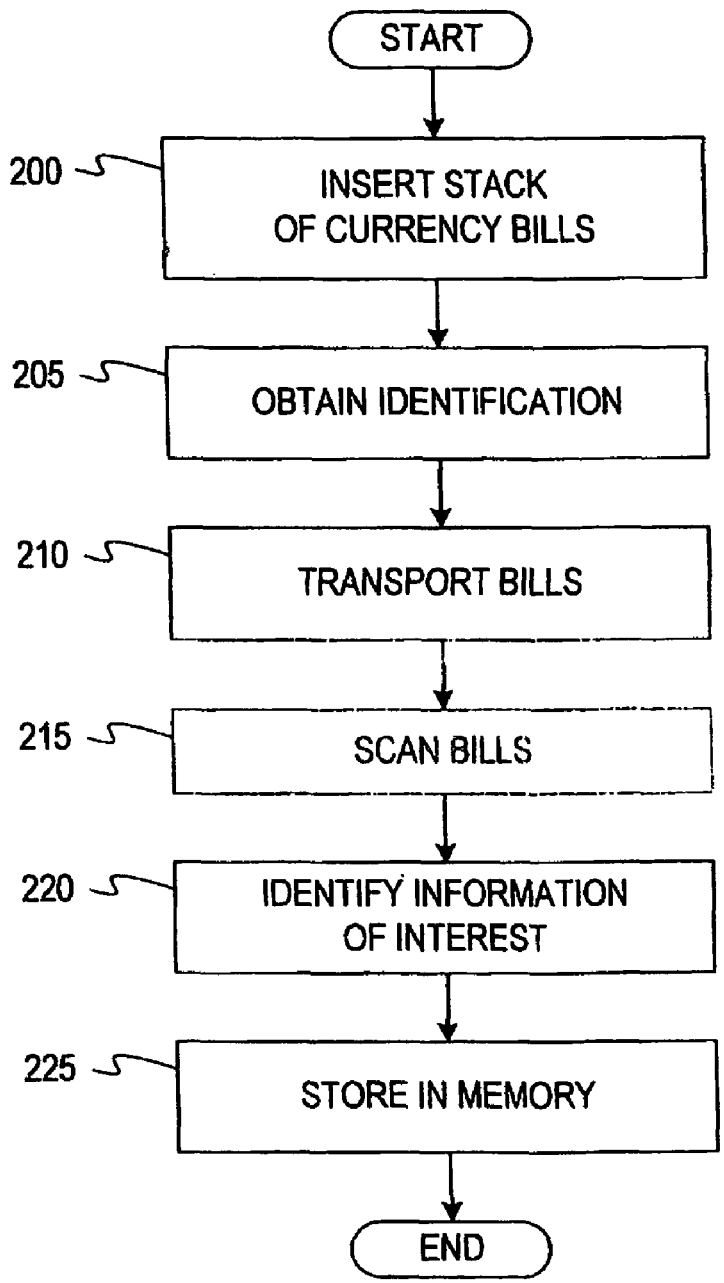
FIG. 3 is a flowchart describing the operation of a document scanning device according to one embodiment of the present invention.

Reference is now made to FIG. 3 wherein there is shown a flowchart describing an embodiment of the operation of a document scanning device, such as the document scanning device 100 of FIGS. 1 and 2. At step 200, a stack of currency bills is placed into the input receptacle of the scanning device. At step 205, the scanning device obtains a transaction/user identification number.

This transaction/user identification number provides a mechanism to link the user who is either contributing (depositing) currency bills or receiving (withdrawing) currency bills to the processed currency bills themselves (it alternatively links a certain transaction number to the currency bills implicated by that transaction). The transaction/user identification number may be any type of unique identifier, such as an account number, PIN, merchant number, social security number, employee number, driver's license number, credit/debit/smart card number, and bar coded or other encoded number. The transaction/user identification number may be encoded based on user name or any other identifying number (such as driver's license number or social security number). The transaction/user identification number may also be an alphanumeric code, a fingerprint, or biometric scan. The transaction/user identification number may also be obtained by a video image of the user or any other known way to identify a person. The transaction/user identification number may be obtained in any number of ways by an identification input device (such as entry through the operator control panel or customer control panel). Other options for the input device include a card reader or perhaps the scanner itself. With respect to the latter option, the number may be read off an encoded sheet, such as a bar encoded slip or a MICR encoded deposit slip, which is input for processing through the device 100. For the control panel option, the number may be input into the device by the operator or by the customer (such as by inputting a PIN or an actual account number). If a card reader is available on the device, the number may be read from an inserted debit/credit/smart card that is input into the device. More generally, the transaction/user identification input device may be any known device capable of receiving commands, such as a keyboard, a keypad, a touch screen, or a mouse, and/or may also be any type of reader, such as a MICR reader, a bar code reader, an optical reader, biometric reader or others known in the art.

The currency bills are then transported by the transport mechanism one at a time (step 210). It should be noted for one embodiment of the invention that the bills which are transported comprise only those bills which are pertinent to a given transaction. For example, in a receiving/withdrawal transaction, the input receptacle may be loaded with many currency bills, but only those currency bills which are needed in connection with the withdrawal transaction are processed by the transport mechanism past the scanner for the given transaction/user identification number. Thus, thousands of dollars worth of currency bills may be present in the input receptacle, but if a transaction for a given transaction/user identification number requires withdrawal of only one-hundred dollars in currency bills, then only one-hundred dollars worth of currency bills are transported past the scanner for that withdrawal. Conversely, in a contributing (depositing) transaction, the input receptacle may be loaded with the currency bills of one or more users, but only those currency bills which are pertinent to the deposit transaction are processed by the transport mechanism past the scanner for the given transaction/user identification, and different user identifications may be associated with each portion of the currency bills being handled. Put another way, the system is capable of associating a currency bill transaction (whether contributing or receiving) with a transaction/user identification number and with the handling (transporting) of the currency bills for that transaction such that the currency bills of different users and different transactions are not mixed with each other with respect to system processing. In this way, collected data (currency bill images, currency bill information of interest—features, serial numbers, and the like) from the scanner can be uniquely associated with a transaction/user identification number (and thus also with a certain transaction).

Each transported currency bill is then scanned in step 215. As discussed above, this scanning operation may involve optically scanning each currency bill to obtain a bill image (of either or both sides of the bill). The bill image may be an image of substantially the entire currency bill (a "full image") or of selected portions (a "partial image") of the currency bill. Alternatively, a line or strip reflective scanning operation may be performed. Other scanning operations may also be used. The performance of step 215 produces scan data. At step 220, this scan data is processed to identify certain information of interest with respect to each currency bill. For example, the identified information of interest may comprise the characters printed in one or more fields of the currency bills. The identified information of interest may also comprise printed features, patterns or relationships on the currency bills. Even more specifically, the identified information of interest comprises bill serial number data.

In step 225, the information of interest from the currency bill is stored in memory in association with the transaction/user identification number. In this way, the information of interest is linked to a certain user and that user's transaction.

For example, in connection with a currency deposit or withdrawal at a bank, the identified information of interest (comprising, for example, currency bill serial number data) is stored in association with the identification number for the user/customer who is making the deposit/withdrawal transaction. In this way, tracking or tracing of currency bills to particular users can be made. This tracking/tracing information may be of specific interest to law enforcement agencies in connection with criminal investigations.

In another example, again in connection with bank deposit and withdrawal transactions, the identified information of interest (comprising, for example, currency bill serial number data) is stored in association with the identification number for the bank teller who is processing the deposit/withdrawal transaction. In this way, tracking or tracing of currency bills through particular teller drawers can be made. This tracking/tracing information may be of specific interest to bank management in assisting with the counting and proofing of teller drawers to detect and prove instances of fraud and theft.

In yet another example, this time in connection with the handling of currency by any entity (for example, a bank or a retail establishment), the identified information of interest (comprising, for example, currency bill serial number data or printed bill feature data) is stored in association with the identification number for the customer and/or employee who are engaging in the transaction. In this way, tracking or tracing of currency bills to certain customers, certain transactions and certain employees can be made. This tracking/tracing information may be of specific interest to the bank or retail establishment in the event of fraud, theft, counterfeiting, and the like, since the currency bill or bills at issue can be linked to the customer/transaction/employee and corrective accounting, training, legal, personnel, and the like, measures can be taken in response thereto.

In each of the foregoing examples, it should be recognized that the tracking/tracing feature provided by the system can be used as effective evidence or proof when needed. For example, money found in connection with a crime can be tracked by serial number (or other feature) using the present system to a certain merchant, retailer, transaction, customer, bank, bank teller, and the like, in order to assist law enforcement in linking the money to possible suspects or to locations where additional criminal investigation can be made. As another example, currency determined to be counterfeit can be traced by serial number (or other feature) using the present system to a certain merchant, retailer, transaction, customer, bank, bank teller, and the like, in order to assist in adjusting account balances. Other examples will be readily recognized by those skilled in the art.

Figure 4:
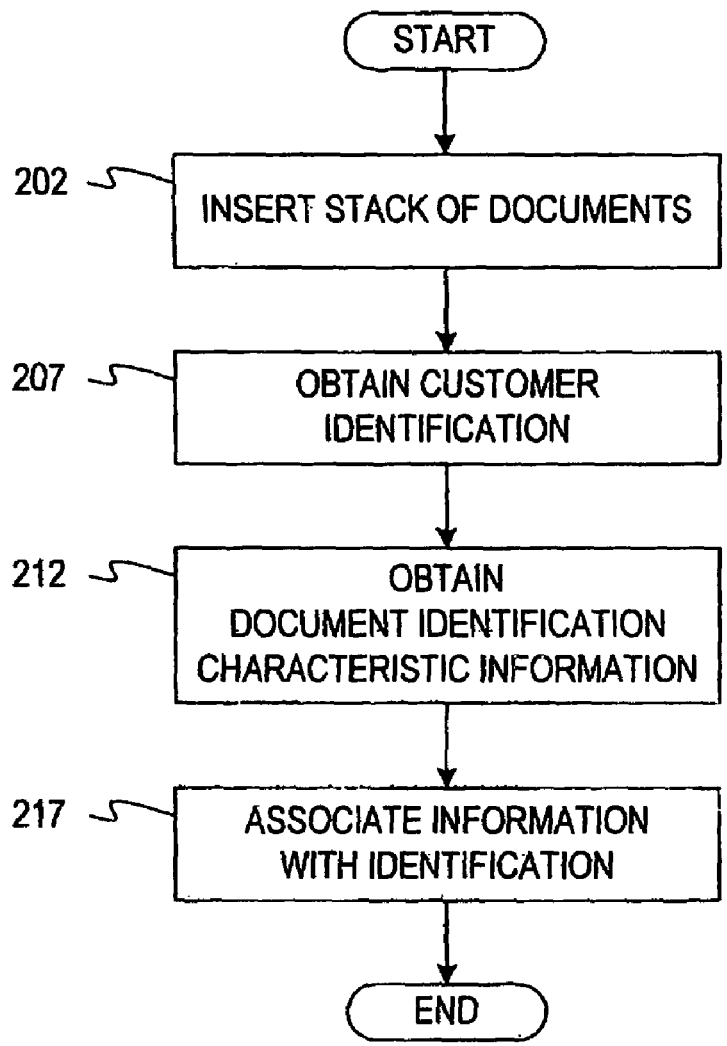
FIG. 4 is a flowchart describing another embodiment of the present invention.

Turning now to FIG. 4, a flowchart describing another embodiment of the present invention is now described. A stack of documents which includes currency bills is inserted into the input receptacle at step 202. Next, at step 207, a customer identifier is obtained. The customer identifier may be any of the transaction/user identifications described above. Next, at step 212, document identification characteristic information is obtained. The document identification characteristic information is any information that may uniquely identify the document that is being presented, such as a serial number, account number, document number, bar code, or another encoded or encrypted identifier. The document identification characteristic information may be encoded information. The document identification characteristic information may be in the form of numbers, letters, and/or symbols as well as other printed or recognizable indicia.

As discussed above, the document identification characteristic information may be obtained by obtaining an image scan (full or partial) of the document. From the image scan, the characteristic information may be obtained by using optical character recognition (OCR) software for identifying the characters printed in the character information fields of the documents. For example, if the character information is the serial number, the OCR may search the full image for a serial number and then extract the serial number once the field is located.

Next, in step 217, the document identification characteristic information is associated with the customer identifier so that the document under examination can be linked for tracking and tracing purposes with the customer/transaction. As discussed above, this can be accomplished by storing the data (characteristic information and customer identifier) in a memory. In the memory, the document is linked to the customer by tying the characteristic information to the customer identifier. For example, if the characteristic information is obtained via image scanning, the customer identifier, as well as the characteristic information, could be tagged onto the image. Alternatively, the characteristic information can be stored in a memory in a file dedicated to the customer (as identified by the customer identifier). This way, someone searching the memory for the document or characteristic information could see that it is stored under a specific customer's identifier. Other methods for linking two or more of the customer, the document being deposited and the characteristic information, are well recognized by those skilled in the art.

As an example of operation, for retail customers, the customer identifier may identify a particular store, branch number, or other division, such as checker, cashier, teller, or department number. The customer identifier may be located on a document that is able to be scanned and used as a divider when the retail customer engages in a transaction. For example, a retail store may have five cashiers and may desire to know which particular cashier is handling certain currency bills. The dividers, or customer identifiers, would be placed between the transactions being handled by different cashiers. The dividers would be scanned, triggering the device to associate the characteristic information for the processed currency bills (for example, serial numbers) with the particular cashier who handled those currency bills. This association may be made as discussed above by storing the characteristic information in a data file linked by the customer identifier to a certain cashier. Alternatively, this association may be made by tagging the image files for the handled currency bills with the characteristic information as well as the customer identifier for the cashier who handled those currency bills. The association process would associate all documents following a certain divider with the customer identifier on that divider. When the next divider was encountered, the association process would switch and associate the next set of documents with indicated customer identifier. This process enables the retail store to pinpoint locations (or even times or people) that are handling certain documents (for example, currency bills).

Figure 5:
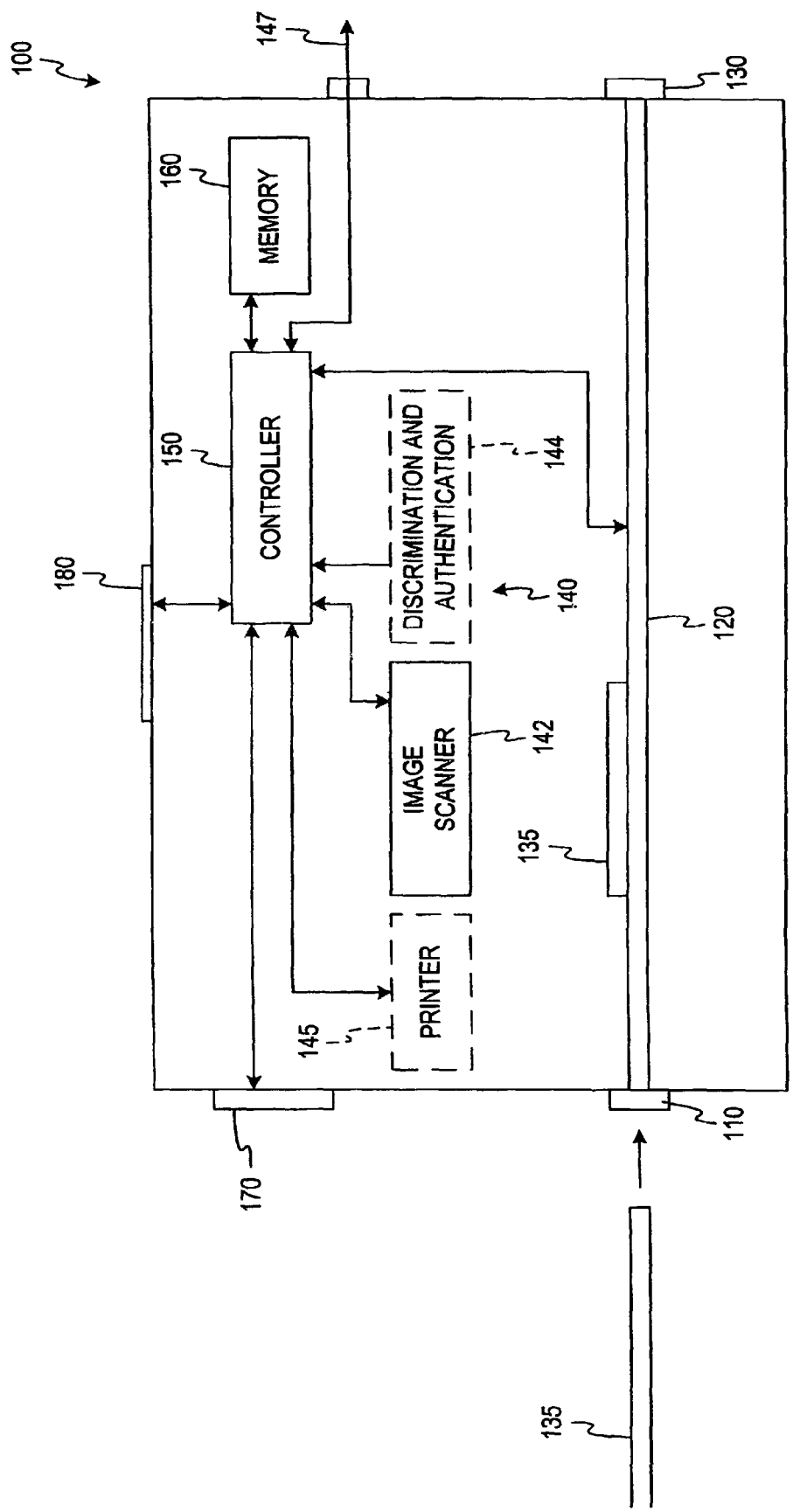
FIG. 5 is a block diagram of a document scanning device according to one embodiment of the present invention.

Reference is now made to FIG. 5 wherein there is shown a block diagram of another embodiment of the document scanning device 100, where like reference numbers refer to like or similar components. In this embodiment, the scanner 140 includes at least an image scanner 142 and possibly, additionally, a discrimination and authentication device 144. It will be recognized that the image scanner 142 and device 144 may be separate physical components performing certain functions or, alternatively, be a single physical component capable of performing multiple functions. The scanner 140 in general, and the image scanner 142 and discrimination and authentication device 144 in particular, are coupled to and controlled by the controller 150.

The transport mechanism 120 moves received documents (such as, for example, currency bills) one by one past the image scanner 142. Responsive to controller 150 commands, the image scanner 142 scans each passing currency bill and obtains a currency bill image. This image may be of one or both sides of the passing currency bill. The image scanner 142 and the transport mechanism 120 are electronically coupled to the controller 150. The controller 150 controls the image scanner 142, creates image files, and controls the transport mechanism 120. Once directed by the controller 150, the transport mechanism 120 transports the currency bill from the input receptacle 110 past the image scanner 142.

In the configuration where the scanner 142 and device 144 are physically separate components, the transport mechanism 120 further conveys the documents (currency bills) one by one past the discrimination and authentication device 144. The discrimination and authentication device 144 may be of the type described in U.S. Pat. Nos. 5,815,592 and 5,982,918, the disclosures of which are incorporated herein by reference. The discrimination and authentication device 144 operates to authenticate the document and determine document value (for example, denominate the currency bill).

Either component, or perhaps both components in certain situations, operate as discussed above to produce scan data. This scan data may be processed to identify certain information of interest with respect to each document. For example, the identified information of interest may comprise the characters printed in one or more fields of the documents. The identified information of interest may also comprise printed features, patterns or relationships on the documents. Even more specifically, the identified information of interest comprises currency bill serial number data or document amount, account number, bank number, or other alphanumerical information.

There are reasons why the use of separate physical components for the image scanner 142 and discrimination and authentication device 144 may be preferred. There may exist differences in processing rates between the two pieces of physical components (for example, it may take longer to image and image process to obtain certain information of interest using the image scanner 142 than it would take to obtain that same information using the discrimination and authentication device 144), and thus the proper component can be assigned the task of obtaining the information of interest which is needed more quickly. Also, the use of two different functionalities in general, and two physically separate components in particular, provides a certain level or redundancy in information of interest determination by the device 100 which helps improve overall data collection accuracy.

It will be recognized that the device 100 need not include the discrimination and authentication device 144 in situations where the functionalities performed by that component are configured for performance by the image scanner 142. Alternatively, it will be recognized that the device 100 need not include the image scanner 142 in situations where the functionalities performed by that component are configured for performance by the discrimination and authentication device 144.

The device 100 may further include a printer 145. The printer 145 is provided to perform a variety of functions. For example, the printer 145 may be used to print a receipt reflecting or recording a given transaction. The printer 145 may also be used to print a copy of certain document images, or perhaps certain information of interest, and may further print information, such as a user identification, which links the information of interest and/or images and/or account number to a given transaction. In this way, a printed record of the transaction which reflects the storage by the system of the linked data may be provided. The controller controls the operation of the printer.

As discussed above, the system may include multiple control panels (for example, operator panel 170 and customer panel 180). Each of the control panels may be used to display information. This information may comprise, for example, error message, collected information of interest, document images (full or partial), system status, stored data, and the like. The control panels may further be used to allow information to be input to the device 100. This information may comprise, for example, control or instruction commands, information of interest which is not detected or discerned by the device, and the like. The control panels may take the form of any suitable input device, such as a numeric keypad, a standard keyboard, a touch screen, and/or denomination keys, that allows for human entry of information, or input devices for more non-human data entry, such as a card reader. The control panels may also take the form of any suitable display device, such as a display screen.

The device 100 further includes a data communication interface 147 which allows the device 100 to engage in external communications. The interface 147 may support any suitable communications protocol and should allow the device to be connected to other devices 100 and/or to a host processing functionality. Through the interface 147, the device communicates collected data (comprising, for example, image data, information of interest, account data, and the like, as described above).

Figure 6A:
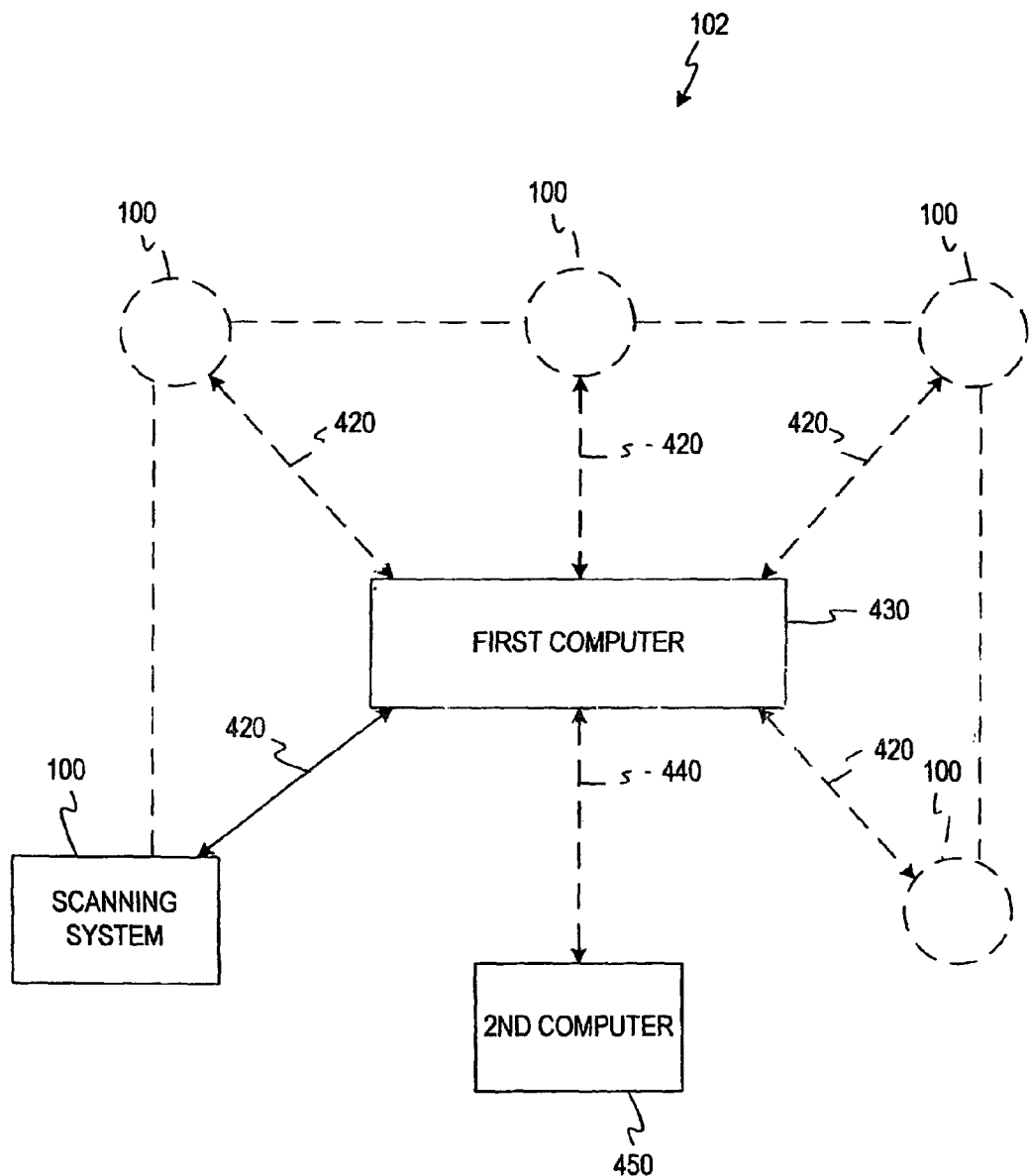
FIGS. 6a-6c are block diagrams of a document processing system in accordance with embodiments of the present invention.
Figure 6B:
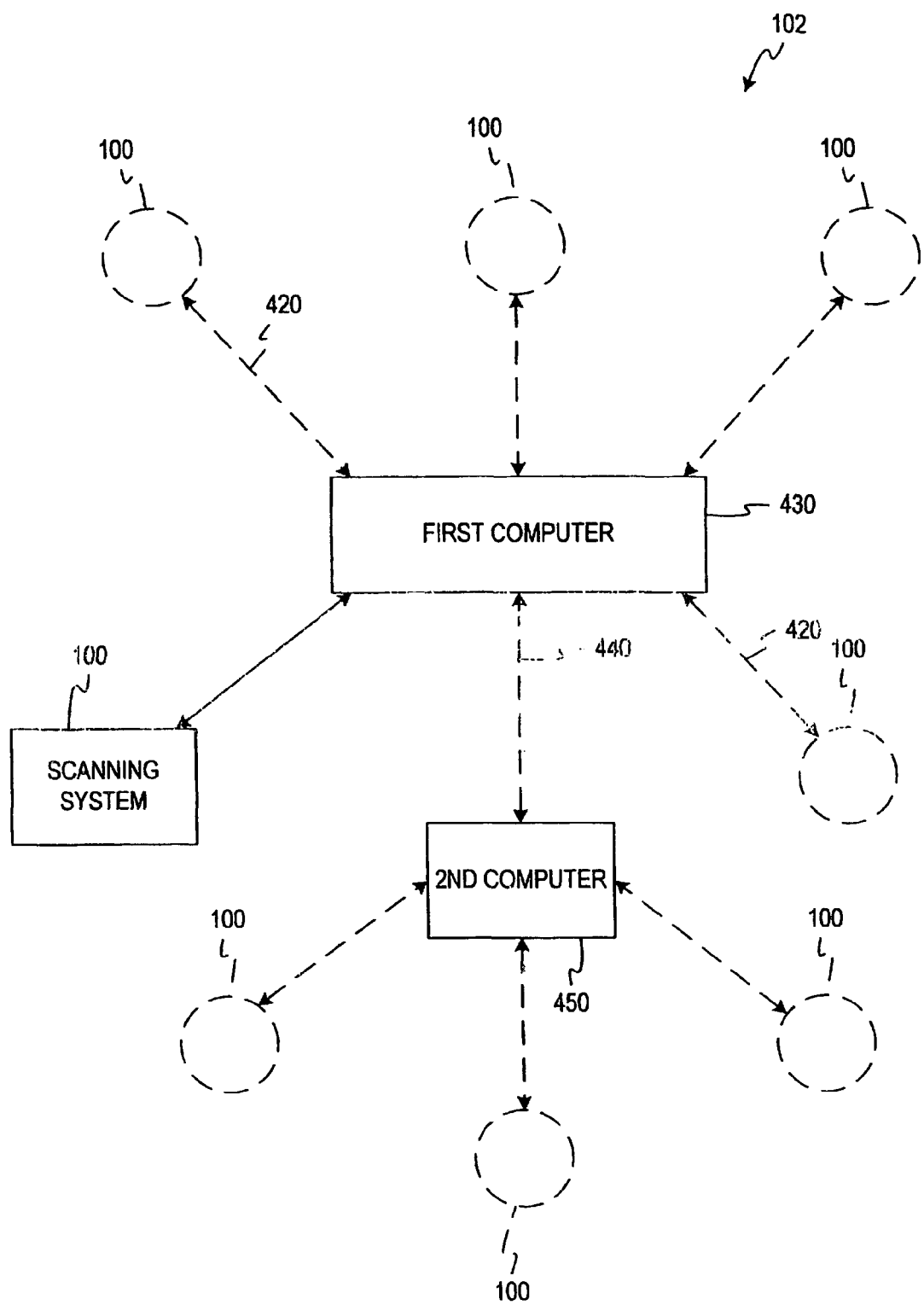
Figure 6C:
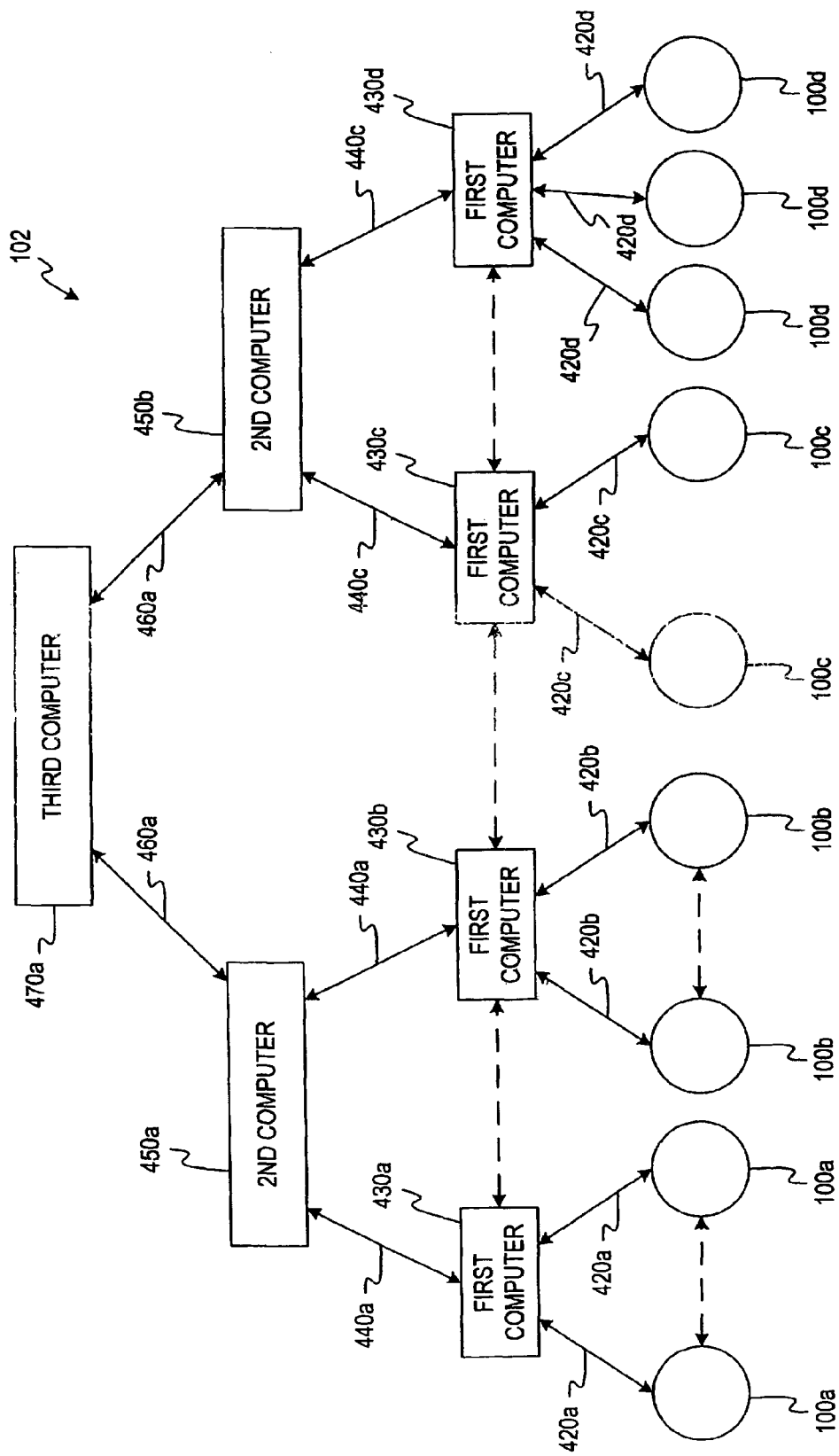

Reference is now made to FIGS. 6a-6c, wherein there are shown block diagrams of a document processing system 102 comprised of at least one device 100 connected through its interface 147 to other components.

In FIG. 6a, the device 100 is connected through its interface 147 and a communication link 420 to a first computer 430. The first computer 430 can be any type of computer, such as a personal computer, a server, part of a LAN, or a mainframe. The communication link 420 can be any link used for data, voice, or video communications that is known in the art, such as a telephone line or a wireless network. The communication link 420 may be over a private line or a public line. In some embodiments, the document scanning device 100 may be connected to the first computer 430 via the internet. Alternatively, the communication link 420 may be over another form of media, such as a radio or microwave link. The first computer 430 may be located in the same place as the document scanning device 100 or it may be in a location remote, or separate, from the document scanning device 100.

For example, it is contemplated that the document scanning device 100 may be located at a branch of a bank, while the first computer 430 is located at the main office or processing center of the bank. In this implementation, the device may be used for bank account currency deposits and/or withdrawals.

In the embodiment illustrated in FIG. 6a, a plurality of document scanning devices 100 may be connected in a "hub and spokes" network architecture as is known in the art. This is illustrated by a plurality of document scanning devices 100 shown in phantom. All of the document scanning devices 100 are linked via the communication links 420 to the first computer 430. Likewise, other network architectures may be used. In order to prevent congestion, an image buffer (not shown) on each document scanning device may store data until polled by the controller or the first computer.

Turning now to FIG. 6b, an embodiment is illustrated where a second computer 450 is also in communication with a plurality of the document scanning devices 100. In this embodiment, the first and second computers 430 and 450, respectively, are also in communication and can share information with each other (see, also, FIG. 6a). In this embodiment, the second computer 450 may be at another bank and may be connected via the communication links 420 to the separate document scanning devices 100. In this embodiment, the second computer 450 would transmit information to the document scanning devices 100 and to the first computer 430. The first computer 430 would then transmit the information to the document scanning devices 100 in its network. Alternatively, the second computer 450 could communicate directly with all of the scanning devices and perform information updating tasks. Even if the second computer 450 is not a bank computer or server, it may still have access to the scanning devices. Some banks may allow their customers to have access to the memory in the document scanning devices 100 to view images that were deposited to or drawn on the customer's account at the bank.

Another embodiment is a pyramid structure, as depicted in FIG. 6c. In this embodiment, document scanning devices 100a are connected via communication links 420a to a first computer 430a. Another set of document scanning devices 100b are connected via communication links 420b to another first computer 430b. The two first computers 430a, 430b are then each linked via the communication links 440a to a second computer 450a which is then in direct communication, via another communication link 460a, with a third computer 470a. Other document scanning devices 100c, 100d, first computers 430c, 430d, and second computer 450b are arranged in a similar fashion. As in the other embodiments, all of the scanning devices 100a, 100b, 100c, 100d may be linked together, or only the scanning devices sharing a same first computer may be linked. Similarly, the first computers may be linked together as may the second computers.

In some embodiments, the individual document scanning device 100 may be linked to each other via the communication link 420 (see, FIG. 6a).

In one embodiment, currency bills are fed into the document scanning device 100 for deposit/withdrawal with respect to a customer's account. The first computer 430 is a part of the banking system at a financial institution that holds the customer's account. The first computer 430 is adapted to adjust the customer's account for the amount of the deposit/withdrawal. Before adjusting the account, currency bills are scanned by the document scanning device 100. A full image or an image of a portion of one side of a deposit bill or bills may then be obtained. A record is also kept, as discussed above, as to the identification (for example, using extracted serial number data) of the currency bills which comprise the deposit/withdrawal, thus giving the bank a record of the particular bills which were in possession of the customer. With this record, a more effective and efficient mechanism is employed to assist in the tracking and tracing of currency bills.

In an alternative embodiment, the second computer 450 may be a customer's computer, such as a home computer or a computer located at a retail store or an office. The second computer 450 may also be a computer at another bank or financial institution.

Figure 7:
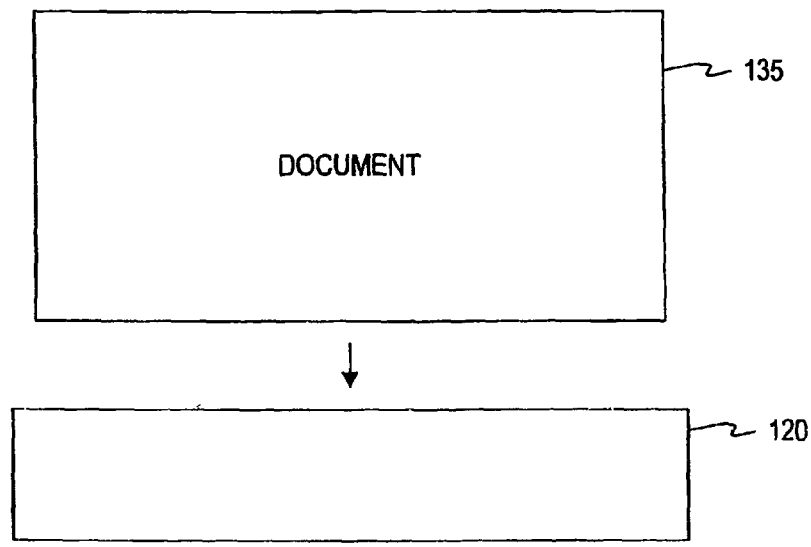
FIG. 7 is a top view of a document being transported past an image scanner so as to permit scanning along the wide dimension of the document.
Figure 8:
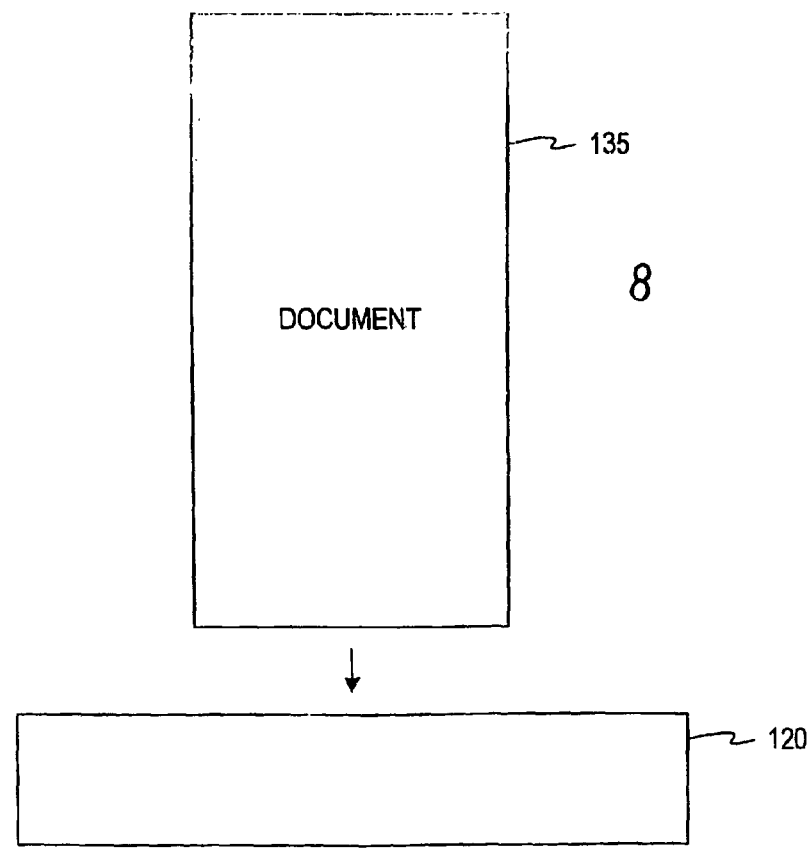
FIG. 8 is a side view of a document being transported past an image scanner so as to permit scanning along the narrow dimension of the document.

Referring now to FIG. 7, the transport mechanism 120 transports the currency bill in a direction that is perpendicular to a longer edge of the currency bill 135. Stated differently, a long edge of the currency bill is the leading edge. In other embodiments, like that shown in FIG. 8, the transport mechanism 120 transports the currency bill 135 in a direction that is parallel to a longer edge of the currency bill 135. Stated another way, a short edge of the currency bill is the leading edge.

Figure 9:
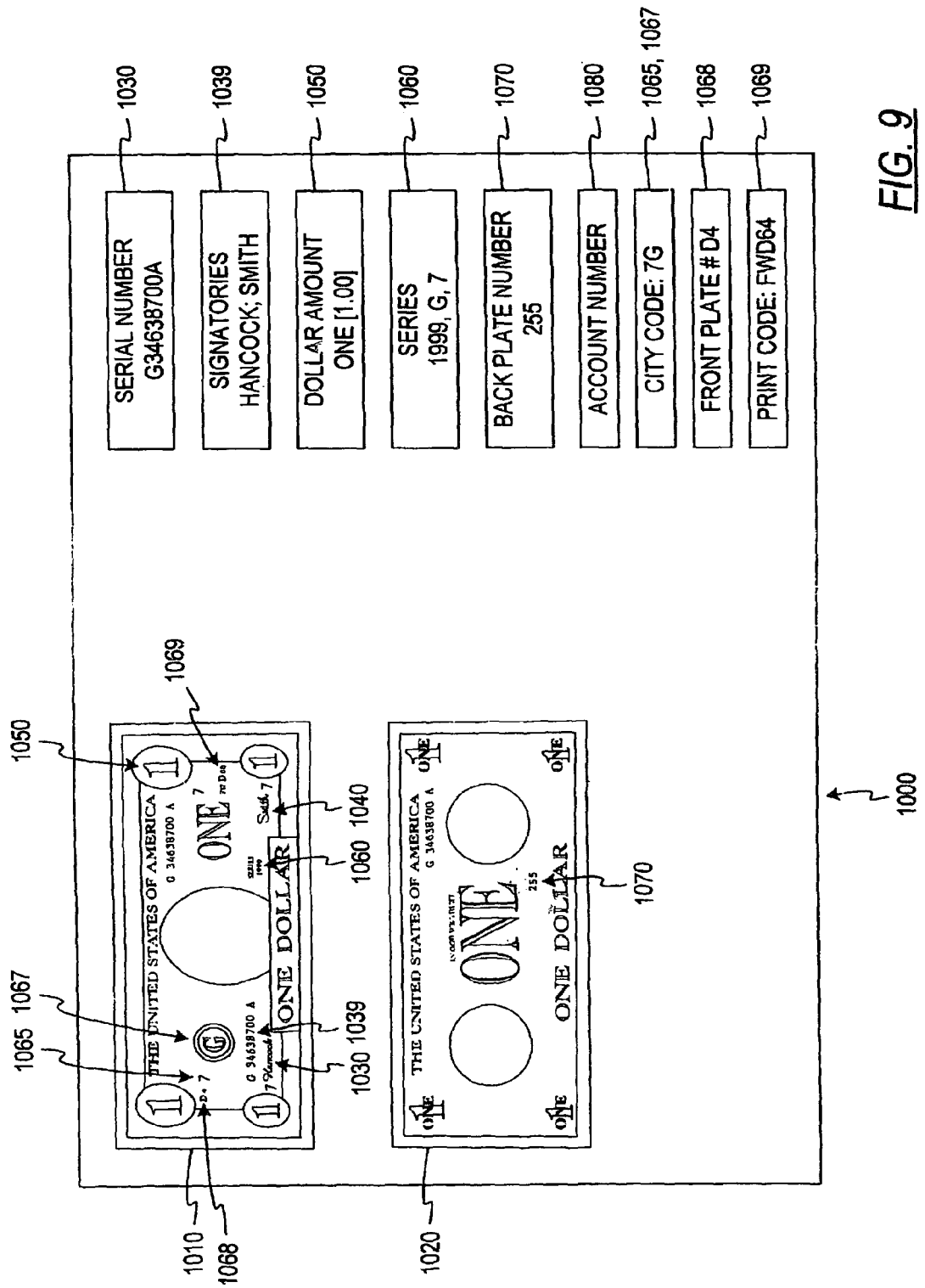
FIG. 9 is a representation of an image file of a currency bill according to an embodiment of the present invention.

Referring now to FIG. 9, an image file 1000 according to one embodiment is shown. The image file 1000 comprises several parts. A first image section 1010 represents one side of the scanned currency bill. The image is a collection of data and is represented here pictorially so as to be more easily explained and understood. In the currency bill sample shown in FIG. 9, the first image section 1010 is the front side of the document scanned, namely, a one dollar bill. Similarly, a second image section 1020 comprises data representing the reverse side of the document, in this case, the back side of the currency bill. On both the first and second image sections 1010 and 1020 of the currency bill, there is information that may be important to have stored separately in the image file for cross-referencing or tracking purposes. For example, the front side of the one dollar bill includes the serial number and the back side includes a plate number. Both of these may be important to include in the image file and may be cross-referenced for sorting purposes.

To assist with bill tracking and tracing operations, the serial number of the currency bill must be obtained. The serial number is extracted from the bill and stored in a data portion 1030 of the image file. Once the serial number of a bill is obtained, the serial number can be useful in tracking the distribution of the bill. It may also be used to help a government official track the whereabouts of criminals and follow currency bills that are being laundered.

The image file 1000 may also include an account number field 1080 that is associated with the currency bill. The account number may be added to the image file by the document scanning system 100 or by the first computer 430 (FIG. 4a). The account number field 1080 refers to the account by which the currency bill is adjusted (either deposit or withdrawal). As discussed above, this number may alternatively refer to the transaction/user identification. This allows someone viewing the image file to know what account/transaction/user obtained adjustment (credit/debit) for the bill. For example, if the bill was deposited and later discovered to be of interest (for example, to law enforcement), by viewing the image file, the user could see what account/transaction/user was credited and could then take the appropriate action.

In some embodiments, it may also be desired to extract signatory information such as a Treasurer's signature 1039 and a signature of the Secretary of Treasury 1040. Likewise, in some embodiments, a dollar amount information 1050, a series information 1060, and the Federal Reserve bank number, a number portion 1065, a letter portion 1067, and a plate number 1070 on the backside of a currency bill 1020, may be extracted. All of these fields may be used for cross-referencing the serial number with the currency bill for purposes of identifying the bills. The signatory information 1039, 1040, the dollar amount information 1050, the series information 1060, the Federal Reserve Bank number 1065, 1067, a front plate number 1068, a print order code 1069, and the back plate number 1070 may all be extracted and inserted into the appropriate fields in the image file. The software is able to be updated to handle these changes in any fields that change over time.

Other fields may also be included in alternative embodiments, such as a field relating to the issuing federal reserve bank, the country of origin (if multiple country currencies are accepted), and others. It is also contemplated that foreign currency may have other useful information on the bill such as other security measures which it may be useful to extract from the image of the bill. One example would be the size of the currency bill. In many foreign countries, the size of the currency bill varies with denomination. As a preliminary measure, the size of the currency bill may be measured to ensure that the bill is the appropriate size.

In other embodiments, the locations of certain items may be different. For example, in the new U.S. series, the picture may be larger or off-center. Also, some of the extracted information may be located in a different position.

Figure 10:
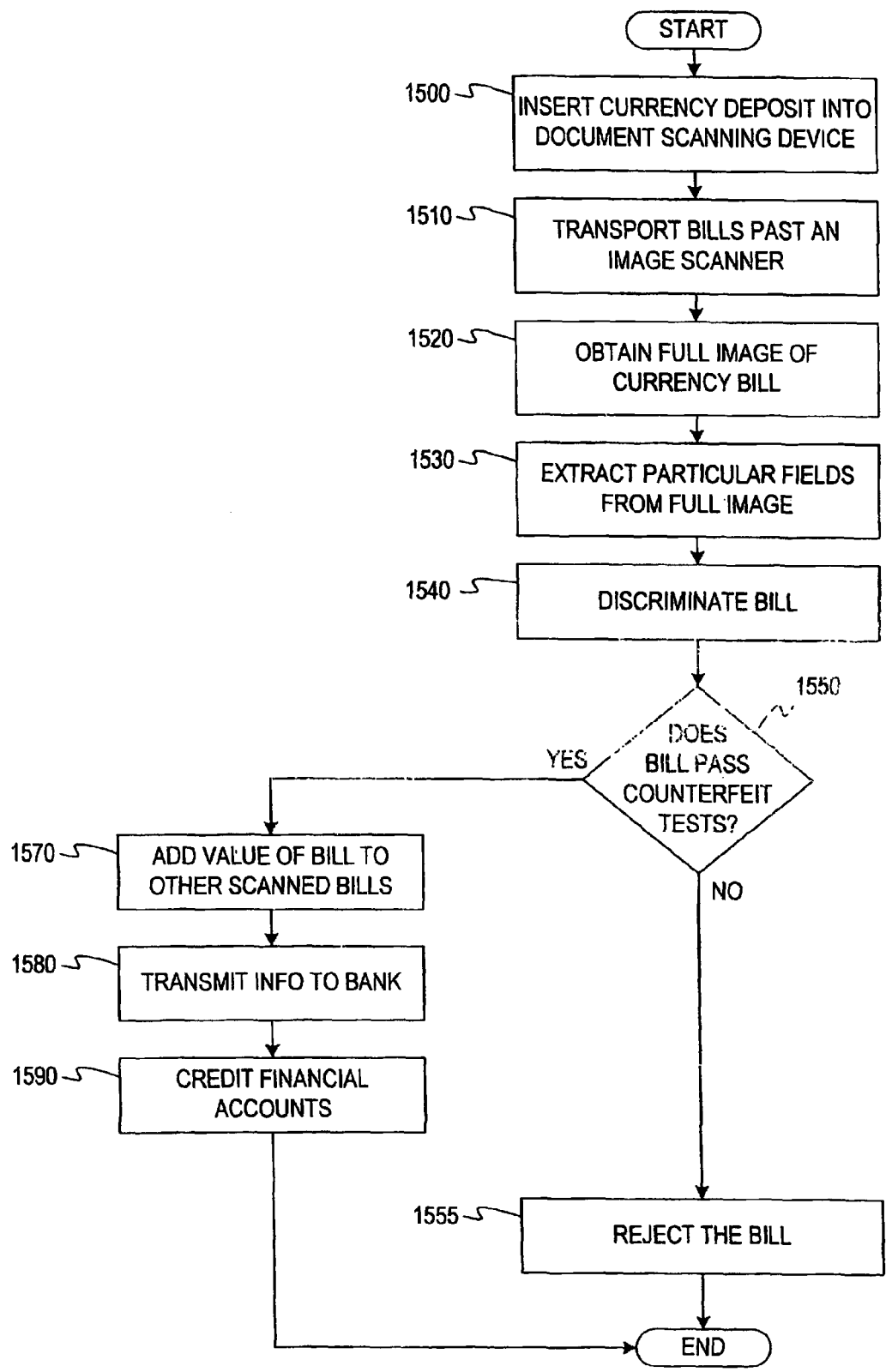
FIG. 10 is a flow chart illustrating the operation of a document processing system according to one embodiment of the present invention.

Referring now to FIG. 10, the operation of a document processing system will be described. First, at step 1500, a customer or operator inserts a currency deposit into a document scanning device of the document processing system. The currency deposit may be inserted one at a time or it may be in a stack. Next, at step 1510, the currency bills are transported one by one, either parallel to a long dimension or perpendicular to a long dimension, past an image scanner as described above. The image scanner then obtains an image (full or partial) of the currency bill at step 1520.

Once the image of the currency bill is obtained, the method proceeds to step 1530 where particular fields may be extracted from the image of the currency bill. The particular fields extracted may include the serial number, signatories, denomination of the currency bill, series and/or issuing Federal Reserve Bank, to name a few. At step 1540, the currency bill is then discriminated. This may be done by a discrimination and authentication unit as described above, or the amount of the bill may be determined from fields that are extracted from the image of the bill at step 1530.

In this embodiment, after denomination occurs, the bill is then tested at step 1550 to determine whether the bill is genuine or a counterfeit. Some counterfeiting tests include measuring light emitted from the bill (visible, ultraviolet, and infrared), testing for watermarks, holograms, magnetics, and security threads, and testing image quality. Another method is to compare the serial number that is extracted from the image of the currency bill to a list of serial numbers stored in a memory. The serial numbers stored in the memory are serial numbers which have been used on counterfeit currency bills. Since counterfeiters often use the same serial numbers repeatedly, a currency bill having a serial number that matches the counterfeit list, may be a counterfeit bill. If the serial number of the scanned bill matches a serial number on the list and/or the currency bill does not pass the other authenticity tests, then, at step 1555, the scanning device rejects the bill. After the scanned currency bill is determined to be counterfeit, the image of the rejected bill may be tagged with the reason for the rejection. By utilizing tagging, a person viewing an image at a later date would know why the currency bill was rejected. The currency bill may be off-sorted by being sorted into a second output receptacle. In other embodiments, the document processing system may halt operation while an operator removes the suspect bill from an output receptacle. It is also contemplated that the operator may be informed via the display of the presence of a suspect bill and its characteristics (i.e., the serial number, whole image of bill). In another embodiment, the presence of a counterfeit bill may also cause the document processing system to signal the proper authorities. The operator may decide, upon inspection of the bill, that the bill is genuine and should be accepted. The operator may then override the decision of the scanning device to reject the bill. Alternatively, the operator may decide that further testing is required and may accept the bill temporarily or on a "hold" basis. If the currency bill is accepted as a "hold," the funds would not become available for withdrawal until the bill was verified as genuine.

If the scanned bill passes the counterfeit tests, the document processing system proceeds to step 1570. The value of the currency bill is then added to the value of the other non-suspect currency bills. Next, the document processing system may then transmit the image file (which may contain the images, image data, or both) to the bank where the customer's account is held (step 1580). The bank then credits the customer's account for the amount of the deposit at step 1590. This process is then repeated until all of the bills inserted at step 1500 have been processed. In another embodiment, the scanning device may store the images until all the currency bills have been scanned and transmit all the images obtained during a single transaction. Alternatively, the images may be stored for a predetermined amount of time or until a memory in the processing system is full. The images would then be transmitted in batches to the bank.

To further aid in the understanding of the invention, an additional specific example of the document scanning device operates will be described with reference to FIG. 11. At step 1755, a person indicates on the scanning device what he wants to do (deposit money or withdraw money) and where (account number at Bank A). This may be similar to how a person would use a standard ATM, with the machine reading a card for certain information (bank name and account number) and the customer inputting other information (what they want done and how much money).

Once the machine has the information, it may instruct the person to insert the bills into an input receptacle (step 1760) for example if a deposit is occurring. At step 1765, the bills for the deposit/withdrawal are then transported one by one past an image scanner which scans each bill as described above. An image file is created containing the image of each currency bill and its serial number (step 1768). The bills are then denominated at step 1770. Credit for the deposit/withdrawal is then made to the person's account at Bank A (step 1780). At step 1785, the image files of the currency bills are communicated to Bank A for storage.

Figure 11:
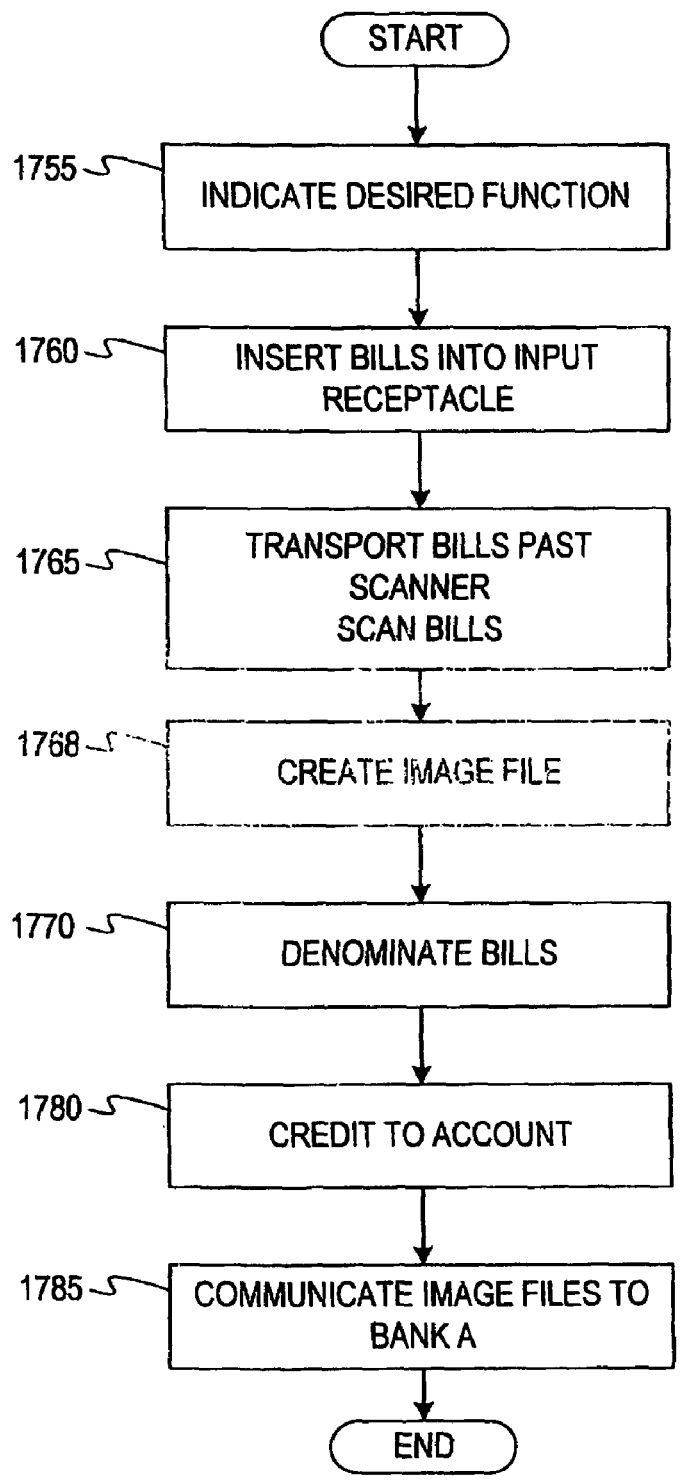
FIG. 11 is a flowchart describing the operation of the document processing system according to one embodiment of the present invention.

The descriptions of FIGS. 10 and 11 relate specifically to deposit transactions. It will be understood, as discussed above, that these operations are equally applicable to withdrawal transactions. Differences include reference to insertion of currency bills. In a withdrawal transaction, the bill will already be present (i.e., inserted) by a person other than the account holder (for example, by bank personnel). In FIG. 11, the step 1780 reference to "credit" would instead be a "debit" in the case of a withdrawal. In either situation, however, deposit or withdrawal, the currency bills at issue in the transaction are scanned, perhaps image scanned, and information of interest, perhaps a serial number, is obtained for each bill. User/transaction/account information is also collected and a file, perhaps a data file or an image depending on the scanning operation performed, is created to link the obtained information of interest to the collected user/transaction/account information.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A currency bill scanning device, comprising:
a receptacle for holding currency bills;
means for obtaining an identifier for a transaction involving one or more of the currency bills;
an image scanner operable to obtain an image from at least one side of a received currency bill and to extract a serial number of the received currency bill from the image; and
a processor communicatively coupled to the image scanner, the processor operable to create a data file comprising the one or more currency bill images, wherein each currency bill image is tagged with the extracted serial number of that currency bill and the identifier of the transaction involving that currency bill to allow for the involved one or more currency bills to be subsequently traced by serial number to that transaction.

2. The device of claim 1 wherein the image scanner obtains at least a partial image of each currency bill.

3. The device of claim 2 wherein the partial image is obtained of each side of each currency bill.

4. The device of claim 1 wherein the image scanner obtains a full image of each currency bill.

5. The device of claim 4 wherein the full image is obtained of each side of each currency bill.

6. The device of claim 1 wherein the means for obtaining the identifier comprises a data entry device.

7. The device of claim 6 wherein the data entry device is a keypad.

8. The device of claim 6 wherein the data entry device is a card reader.

9. The device of claim 6 wherein the data entry device is a biometric scanner.

10. The device of claim 1 further including a currency bill denomination discriminator.

11. The device of claim 10 wherein the denomination discriminator is operative to extract a bill denomination value from the image.

12. The device of claim 1 further including a transport mechanism adapted to transport the one or more currency bills, one at a time, from an input receptacle past the image scanner, to at least one output receptacle.

13. The device of claim 12 wherein the one or more currency bills are transported by the transport mechanism with a narrow dimension parallel to a direction of transport.

14. The device of claim 12 wherein the at least one output receptacle is a plurality of output receptacles.

15. The device of claim 1 further including a controller adapted to control the operation of the device.

16. The device of claim 1 further including a memory for storing the data file.

17. The device of claim 1 further comprising an interface through which the data file is communicated from the device to a computer.

18. The device of claim 1 wherein the image scanner extracts a denomination of the currency bill that is further included in the data file.

19. The device of claim 1 wherein the image scanner extracts a Federal Reserve Bank number of the currency bill that is further included in the data file.

20. The device of claim 1 wherein the image scanner extracts a signatory on the currency bill that is further included in the data file.

21. A method for distributing currency bills, comprising:
obtaining an identifier for a currency bill distribution transaction;
distributing a number of currency bills for that transaction;
at least partially imaging each distributed currency bill;
using a processor, extracting a currency bill serial number from the currency bill image; and
using the processor or another processor, linking the currency bill image with the serial number(s) for the distributed currency bill(s) and the transaction identifier so as to allow the distributed currency bills to be traced to a certain transaction by their serial number.

22. The method of claim 21 wherein the distribution transaction comprises a currency bill withdrawal transaction.

23. The method of claim 21 wherein linking comprises forming an image file containing the at least partial image of each currency bill for that transaction along with the serial number of those currency bills and the transaction identifier.

24. A device for distributing currency bills, comprising:
means for obtaining an identifier for a currency bill distribution transaction;
a mechanism for distributing a number of currency bills for that transaction;
an imaging device operable to at least partially image each distributed currency bill and extract a currency bill serial number; and
a processor communicatively coupled to the imaging device, the processor operable for linking the currency bill image(s) with the serial number(s) for the distributed currency bill(s) and the transaction identifier so as to allow the distributed currency bills to be traced to a certain transaction by their serial number.

25. The device of claim 24 wherein the distribution transaction comprises a currency bill withdrawal transaction.

26. The device of claim 24 wherein the linking includes forming an image file containing the image of each currency bill for that transaction along with the serial number of those currency bills and the transaction identifier.

27. The device of claim 26 further including a memory for storing the image file.

28. A device for distributing currency bills, comprising:
a control panel for obtaining an identifier for a currency bill distribution transaction;
a mechanism for distributing a number of currency bills for that transaction;
an imaging device operable to at least partially image each distributed currency bill and extract a currency bill serial number; and
a processor communicatively coupled to the imaging device, the processor operable for linking the currency bill image(s) with the serial number(s) for the distributed currency bill(s) and the transaction identifier so as to allow the distributed currency bills to be traced to a certain transaction by their serial number.

29. A currency bill scanning method, comprising:
receiving currency bills;
obtaining an identifier for a transaction involving the received currency bills;
scanning the currency bills to obtain an image from at least one side of each received currency bill;
using a processor, extracting a serial number of each received currency bill from the obtained images; and
using the processor or another processor, creating a data file comprising fields populated with at least a portion of the obtained currency bill images, wherein each currency bill image field is tagged to additional fields including the extracted serial number and the identifier of the transaction involving that currency bill thereby allowing the received currency bills to be subsequently traced by serial number to the transaction.

30. The method of claim 29 wherein scanning obtains at least a partial image of each currency bill.

31. The method of claim 30 wherein the partial image is obtained of each side of each currency bill.

32. The method of claim 29 wherein scanning obtains a full image of each currency bill.

33. The method of claim 32 wherein the full image is obtained of each side of each currency bill.

34. The method of claim 29 further including denominating each currency bill.

35. The method of claim 34 wherein denominating comprises extracting a bill denomination value from the image.

36. The method of claim 29 further including transporting the currency bills, one at a time, from an input receptacle to at least one output receptacle.

37. The method of claim 36 wherein the currency bills are transported with a narrow dimension parallel to a direction of transport.

38. The method of claim 36 wherein the at least one output receptacle is a plurality of output receptacles.

39. The method of claim 29 further comprising storing the data file.

40. The method of claim 29 further comprising communicating the data file through an interface associated with a network.

41. The method of claim 29 further including extracting a Federal Reserve Bank number of the currency bill, the extract Federal Reserve Bank number further being included in the data file.

42. The method of claim 29 further including extracting a signatory from the currency bill, the signatory further being included in the data file.

43. A method for receiving currency bills, comprising:
obtaining an identifier for a currency bill reception transaction;
receiving a plurality of currency bills for the transaction;
at least partially imaging each received currency bill and extracting a currency bill serial number from the currency bill image; and
using a processor, linking the currency bill image(s) with the serial number(s) for the received currency bill(s) and the transaction identifier thereby allowing the received currency bills(s) to be traced to the reception transaction by their serial number,
wherein linking comprises forming an image file populated with fields containing the at least partial image of each currency bill for that transaction, the serial number associated with the partial image, and the transaction identifier.

44. The method of claim 43 wherein the reception transaction comprises a currency bill deposit transaction.

45. A device for receiving currency bills, comprising:
means for obtaining an identifier for a currency bill reception transaction;
a mechanism for receiving a plurality of currency bills for the reception transaction;
an imaging device operable to at least partially image each received currency bill and extract a currency bill serial number; and
a processor communicatively coupled to the imaging device, the processor operable for linking the currency bill image(s) with the serial number(s) for the received currency bill(s) and the transaction identifier thereby allowing the received currency bills to be traced to the reception transaction by their serial number,
wherein the linking includes forming an image file populated with fields containing the image of each received currency bill, each extracted serial number, and the transaction identifier.

46. The device of claim 45 wherein the reception transaction comprises a currency bill deposit transaction.

47. A device for receiving currency bills, comprising:
a control panel for obtaining an identifier for a currency bill reception transaction;
a mechanism for receiving a plurality of currency bills for the reception transaction;
an imaging device operable to at least partially image each received currency bill and extract a currency bill serial number; and
a processor communicatively coupled to the imaging device, the processor operable for linking the currency bill image(s) with the serial number(s) for the received currency bill(s) and the transaction identifier thereby allowing the received currency bills to be traced to the reception transaction by their serial number,
wherein the linking includes forming a data file populated with fields containing the image of each currency bill for the reception transaction, the associated currency bill serial number, and the transaction identifier.

* * * * *